US009558468B2

United States Patent
Donlan et al.

(10) Patent No.: US 9,558,468 B2
(45) Date of Patent: Jan. 31, 2017

(54) TRANSPORTATION ROUTE MANAGEMENT

(75) Inventors: Brian Donlan, Southport, FL (US); Michael Baumgartner, Panama City, FL (US); Norayr Minassian, Cupertino, CA (US); Michael Warkander, Panama City, FL (US)

(73) Assignee: Cubic Corporaton, San Diego, CA (US)

( * ) Notice: Subject to any disclaimer, the term of this patent is extended or adjusted under 35 U.S.C. 154(b) by 971 days.

(21) Appl. No.: 13/049,704

(22) Filed: Mar. 16, 2011

(65) Prior Publication Data

US 2012/0235791 A1 Sep. 20, 2012

(51) Int. Cl.
*H04Q 5/22* (2006.01)
*G06Q 10/08* (2012.01)
*G06Q 50/28* (2012.01)

(52) U.S. Cl.
CPC .......... *G06Q 10/08* (2013.01); *G06Q 10/0833* (2013.01); *G06Q 50/28* (2013.01); *H04Q 2213/13095* (2013.01)

(58) Field of Classification Search
CPC ............ G06K 7/10009; G06K 19/0723; G06K 19/07749; G06Q 10/08; G06Q 10/0833; G06Q 50/28; G06N 5/048
USPC ..... 340/10.1, 426.15, 426.16, 426.19, 426.2, 340/426.22, 426.23, 426.36
See application file for complete search history.

(56) References Cited

U.S. PATENT DOCUMENTS

| 5,541,845 A * | 7/1996 | Klein ........................... 701/446 |
| 5,883,594 A * | 3/1999 | Lau ........................... 342/357.63 |
| 5,907,286 A * | 5/1999 | Kuma ........................... 340/5.5 |
| 6,057,779 A | 5/2000 | Bates |
| 6,753,775 B2 * | 6/2004 | Auerbach et al. ........ 340/539.22 |
| 6,862,499 B1 * | 3/2005 | Cretella et al. ............... 700/299 |
| 6,983,202 B2 | 1/2006 | Sanqunetti |
| 2004/0041706 A1 * | 3/2004 | Stratmoen .............. G06Q 10/08 340/539.26 |
| 2004/0155477 A1 * | 8/2004 | Lanigan et al. ................. 296/50 |
| 2006/0129691 A1 * | 6/2006 | Coffee et al. ................. 709/230 |
| 2006/0200305 A1 | 9/2006 | Sheha et al. |
| 2007/0143013 A1 | 6/2007 | Breen |
| 2009/0096586 A1 | 4/2009 | Tubb |
| 2009/0198659 A1 | 8/2009 | Erickson |
| 2010/0283575 A1 | 11/2010 | Tubb et al. |

* cited by examiner

*Primary Examiner* — Jennifer Mehmood
*Assistant Examiner* — Yong Hang Jiang
(74) *Attorney, Agent, or Firm* — Kilpatrick Townsend and Stockton, LLP

(57) ABSTRACT

Monitoring systems in accordance with the disclosure store one or more reporting behavior profiles that include parameters that determine when a monitoring device associated with a shipping container initiates transmission of a status message to a remote location, e.g., an operations center, a government interface, or a commercial interface. At least a portion of the parameters of the reporting behavior profiles are dependent on a location of the monitoring system. The reporting behavior profiles can cause the monitoring device to initiate a message based on many conditions. For example, the report conditions can include when the present location deviates from a predetermined route of the reporting behavior profile, when the present location of the container remains unchanged for a certain time, when a security condition of the container changes, when an environmental condition of the container changes, etc.

16 Claims, 22 Drawing Sheets

```
if(Long2 != Long1)   // For non-vertical lines
{
        if(Lat2 > Lat1)
        {
                if( (Lat2 > Lati) and (Lati > Lat1) )
                {//Pgps is in the center region}
                else
                {//Pgps is in the left region or right region.
                Calculate distance from P1 or P2 to determine if it is
                within the semicircle at the end.}
        }
        elsif(Lat1 > Lat2)   //If L1 is sloped the other way
        {
                if( (Lat1 > Lati) and (Lati > Lat2) )
                {//Pgps is in the center region}
                else
                {//Pgps is in the left region or right region.}
        }
        else  //Lat1 == Lat2; horizontal line
        {
                //We do not need to calculate Pi for horizontal lines if(Long2 > Long1)
                {
                        if( (Long2 > LongGPS) and (LongGPS > Long1) )
                        {//Pgps is in the center region}
                        else
                        {//Pgps is in the left region or right region.}
                }
                elsif(Long1 > Long2)   //If L1 is sloped the other way
                {
                        if( (Long1 > LongGPS) and (LongGPS > Long2) )
                        {//Pgps is in the center region}
                        else
                        {//Pgps is in the left region or right region.}
                }
        }
}
else   //Long1 == Long2
{
        //For vertical lines, see section 2.6
}
```

Fig. 9

TRANSPORTATION ROUTE MANAGEMENT

BACKGROUND

Global trade is one of the fastest growing portions of the global economy. More countries than ever are importing and exporting more products than ever before. The vast majority of products are shipped in one or more types of cargo containers. About 90% of the world's trade is transported in cargo containers. Containers include ISO (International Organization of Standardization) containers, shipped by ship or train, and truck containers.

Cargo containers can contain valuable products that are easy targets for thieves. Cargo containers can also contain dangerous products that could be used for evil purposes if allowed to fall into the wrong hands. Terrorists, for example, could use a cargo container to transport explosives, or radiological material in order to attempt to disrupt the economic infrastructure of developed countries. The vulnerability of international shipping has been the focus of a program known as the Container Security Initiative (CSI) that was launched in 2002 by the U.S. Bureau of Customs and Border Protection (CBP).

CSI addresses the security concerns of shipping by focusing on four main areas. The four main areas addressed by CSI include:

Using intelligence and automated information to identify and target containers that pose a risk for terrorism.

Pre-screening those containers that pose a risk at the port of departure before they arrive at U.S. ports.

Using detection technology to quickly pre-screen containers that pose a risk.

Using smarter, tamper-evident containers.

Those responsible for cargo would like a "timely" notification when their cargo is not where it is suppose to be when it is not suppose to be there. Possible reasons that a cargo may go missing include hijacking, misdirected cargo, being left for an extended time at a transfer point, etc. Normally, tracking of this type is a computationally intensive task that is performed in a data center based on possibly out-dated position data.

SUMMARY

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

A system for operating a container management system in accordance with the disclosure includes a housing configured to couple to a container, and a monitoring circuit at least partially enclosed within the housing. The monitoring circuit includes a memory storing reporting behavior profiles, each of the reporting behavior profiles defining behavior parameters affecting conditions under which the monitoring device initiates transmission of a message, where at least a portion of the behavior parameters are a function of location. The monitoring circuit includes a sensor interface configured to receive information from at least one sensor associated with the container, the information being indicative of at least one condition associated with the container. The monitoring circuit also includes a position location module configured to determine a location of the monitoring device, a wireless module, and a controller coupled to the first memory, the sensor interface, the wireless module and the position location module. The controller is configured to monitor the at least one condition associated with container and/or another condition associated with the monitoring device, receive a wakeup signal, receive an indication of a present location of the monitoring device from the position location module in response to receiving the wakeup signal, compare the present location with respective location parameters associated with respective ones of the plurality of reporting behavior profiles. If the determined present location corresponds to at least one of the compared location parameters of the plurality of reporting behavior profiles, the controller selects the at least one corresponding reporting behavior profile, and causes the wireless module initiate a transmission of a reporting message to a remote location based on the behavior parameters of the at least one matching reporting behavior profile and the monitored condition of the monitoring device and/or the container. The system further includes a battery coupled to the monitoring circuit and configured to provide electrical power to at least a portion of the monitoring circuit.

A method of managing the reporting behavior of a container monitoring device includes receiving information at a monitoring device coupled to a container from at least one sensor associated with the container, the information being indicative of at least one condition associated with the container, monitoring the at least one condition associated with the container and/or another condition associated with the monitoring device, and receiving a wakeup signal at the monitoring device. The method further includes, subsequent to receiving the wakeup signal, determining a present location of the monitoring device, and comparing the present location with respective location parameters associated with respective ones of a plurality of reporting behavior profiles stored in a memory of the monitoring device, each of the reporting behavior profiles defining behavior parameters affecting conditions under which the monitoring device initiates transmission of a message, at least a portion of the behavior parameters being a function of location. The method further includes, if the determined present location corresponds to at least one of the compared location parameters of the plurality of reporting behavior profiles, selecting the at least one corresponding reporting behavior profile; and determining to initiate a transmission of a reporting message to a remote location based on the behavior parameters of the at least one matching reporting behavior profile and the monitored condition of the monitoring device and/or the container.

A machine-readable media having instructions stored thereon for managing the reporting behavior of a container monitoring device includes instructions causing one or more machines to receive information at a monitoring device coupled to a container from at least one sensor associated with the container, the information being indicative of at least one condition associated with the container, monitor the at least one condition associated with the container and/or another condition associated with the monitoring device, and receive a wakeup signal. The instructions further cause the one or more machines to, subsequent to receiving the wakeup signal, and determine a present location of the monitoring device, compare the present location with respective location parameters associated with respective ones of a plurality of reporting behavior profiles stored in a memory of the monitoring device, each of the reporting behavior profiles defining behavior parameters affecting conditions under which the monitoring device initiates transmission of a message, at least a portion of the behavior parameters being a function of location. The instructions further cause the one or more machines to, if the determined present location corresponds to at least one of the compared location parameters of the plurality of reporting behavior profiles, select the at least one corresponding reporting behavior profile, and cause initiation of a transmission of a reporting message to a remote location based on the behavior parameters of the at least one matching reporting behavior profile and the monitored condition of the monitoring device and/or the container.

Items and/or techniques described herein may provide one or more of the following capabilities. Identifying, in a timely manner, that an asset being moved/transferred has deviated from a planned route by using a combination of geographic and time deviation algorithms. Alerting a remote data center in a timely manner, using a small tracking device that uses a combination of geographic and time deviations, that an asset being moved/transferred has deviated from it planned route/schedule. Utilizing an efficient algorithm to compute deviations from a planned route and/or schedule to determine that an asset has deviated from its planned route/schedule. Identifying and reporting, in a timely manner, that an asset being move/transferred has been tampered with, such as the container doors have been opened mid-transfer, for example. A door opening mid trip could be an indication that container contents have been removed, or additional (e.g., unauthorized) items have been added to the container. Identifying and reporting that a cargo being move/transferred in a shipping container has been subjected to damaging conditions such as temperature extremes, humidity extremes, or excessive shock.

BRIEF DESCRIPTION OF THE DRAWINGS

FIG. 9 is a listing of computer pseudo-code showing exemplary logic for determining zoning of a present location of a monitoring device within a geo-zone segment in accordance with the disclosure.

Figure 1A:
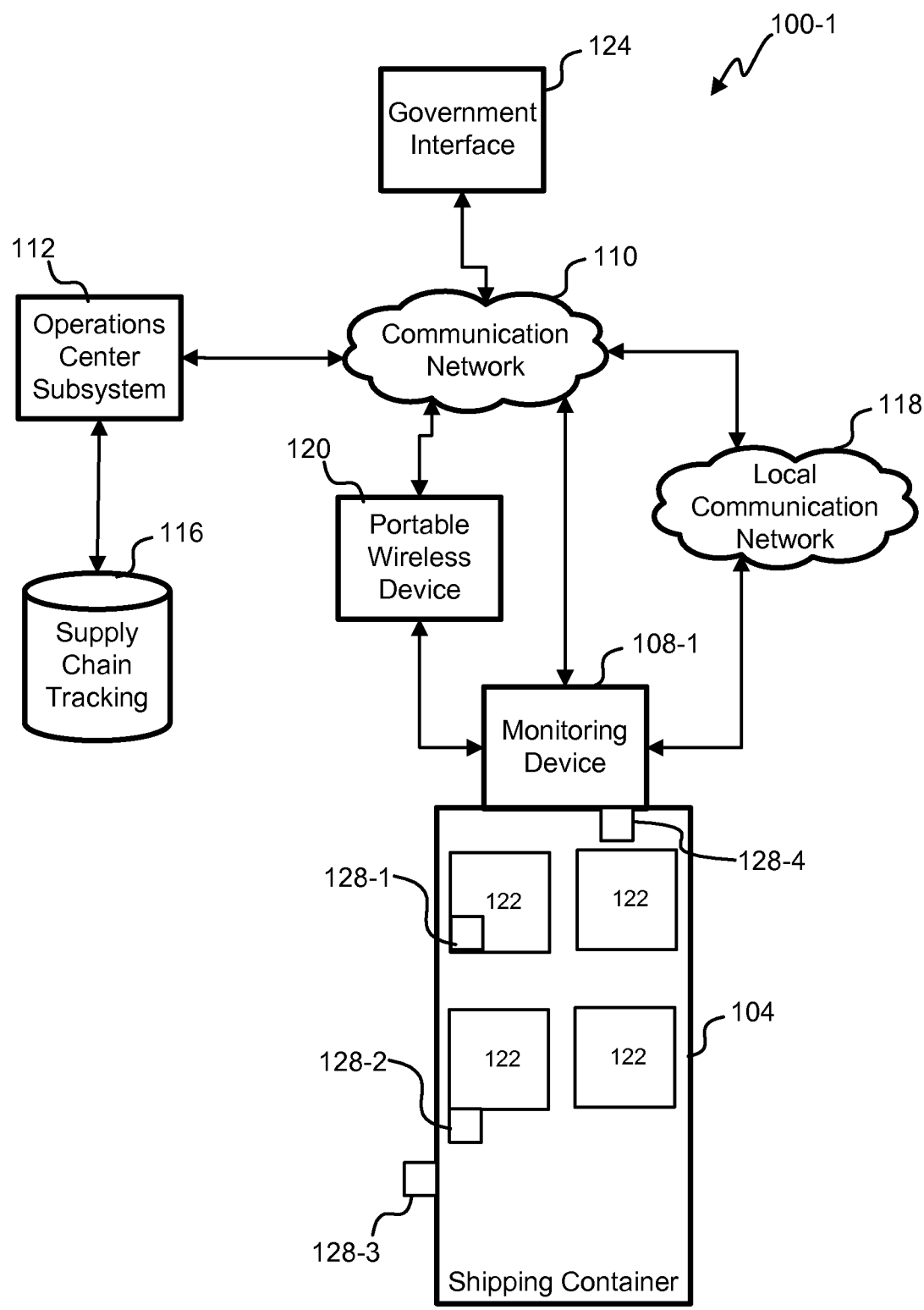
FIG. 1A depicts a example of an active container route management system in which a monitoring device in accordance with the disclosure are utilized.

The features, objects, and advantages of embodiments of the disclosure will become more apparent from the detailed description set forth below when taken in conjunction with the drawings. In the drawings, like elements bear like reference labels. Various components of the same type may be distinguished by following the reference label with a dash and a second label that distinguishes among the similar components. If only the first reference label is used in the specification, the description is applicable to any one of the similar components having the same first reference label irrespective of the second reference label.

DESCRIPTION

Monitoring systems in accordance with the disclosure store one or more reporting behavior profiles that include parameters that determine when a monitoring device associated with a shipping container initiates transmission of a status message to a remote location, e.g., an operations center, a government interface, or a commercial interface. At least a portion of the parameters of the reporting behavior profiles are dependent on a location of the monitoring system. The reporting behavior profiles can cause the monitoring device to initiate a message based on many conditions. For example, the report conditions can include when the present location deviates from a predetermined route of the reporting behavior profile, when the present location of the container remains unchanged for a certain time, when a security condition of the container changes, when an environmental condition of the container changes, etc.

Referring initially to FIG. 1A, an active route management system 100-1 includes a shipping container 104, an active monitoring device 108-1 and a communication network 110. The monitoring device 108-1 is attached to the shipping container 104, for example, attached to one or more of a door, a wall, a floor or a roof of the shipping container 104. In some systems 100-1, the monitoring device 108-1 is configured to monitor access to the inside of the shipping container 104. For example, the monitoring device can include a door sensor configured to detect when the doors of the shipping container 104 are opened and/or closed.

The monitoring device 108-1 includes a wireless module (not shown) that is configured to communicate over the communication network 110. The wireless module can include one or more wide area network or WAN radios and one or more local area network or LAN radios. LAN radios of the wireless module can include one or more of WiFi (IEEE 802.11 standards), Bluetooth, or Zigbee (802.15.4), whereas WAN radios can include cellular (e.g., CDMA, TDMA, GSM, etc.), RFID, satellite (e.g., Comsat or Iridium), and/or infrared transceivers.

The monitoring device 108-1 stores one or more reporting behavior profiles in persistent storage memory. Each reporting behavior profile defines behavior parameters affecting conditions under which the monitoring device 108-1 will initiate a transmission with the wireless module to a remote location via the communication network 110. At least a portion of the behavior parameters cause the monitoring device to initiate transmissions based on a location of the monitoring device.

The wireless module can additionally communicate with sensor modules 128 located internal or external to the shipping container 104. Some embodiments could have wired connections to some or all of the sensor modules 128. The sensor modules 128 include a sensor module 128-1 located inside a shipping crate 122, a sensor module 128-2 attached externally to another crate 122, a sensor module 128-3 attached externally to the shipping container 104 and a sensor module 128-4 attached inside the shipping container 104 near the monitoring device 108-1. In one embodiment, the shipping crates 122 are refrigeration units.

The sensor modules 128 can include one or more of CBRNE (chemical, biological, radiation, nuclear and explosives), temperature, pressure, humidity, weight, acceleration, sound, video, image, infrared, radiation (e.g., light or RF) and/or other types of sensors. The sensor modules 128 include a communication subsystem that can communicate directly with the monitoring device 108-1 or indirectly through other sensor modules 128, a hub and/or a router. The communication subsystem of the sensors 128 can provide one or more wired and/or wireless communication capabilities. For example, the sensor module 128-4 could serve as a hub sensor and the sensor modules 128-1, 128-2 and 128-3 could communicate information to the hub sensor module 128-4 and the hub sensor module 128-4 could forward the information to the monitoring device 108-1.

The sensor modules 128 could be attached magnetically, with adhesives or coupled in other ways so as to be anywhere internal or external to the container 104 and/or the crates 122. In one embodiment, the sensor modules 128 can include wall mounted sensors (mounted on the interior or exterior walls of the shipping container 104), and/or cargo mounted sensors (e.g., mounted on the shipping crates 122). The sensor modules 128 can be formed on or in a flexible material that includes an adhesive backing in order to attach the sensors to the container 104.

The sensor modules 128 can include different power configurations including, an integral power source, a wireless power source which is powered when it is placed within an electromagnetic field generated by a RFID reader or other wireless power source, or a power source that is integrated with the container (e.g., a generator, a refrigeration unit, light circuits, etc.). Some sensor modules 128 have the ability to detect trace materials (vapors, emanations or particles) associated with a known compound that is or may be representative of an item of interest. Some sensor modules 128 detect the trace material(s) and report it wirelessly to an RFID reader to deter, prevent or contain the potential threat should it be validated. In addition to being able to detect the item of interest, some embodiments also provide an indication of the volume or strength of trace materials detected.

The sensor modules 128 and the monitoring device 108-1 can also contain a unique authentication code such as, for example, a serial number, for identification purposes, or a cryptographic key or public/private cryptographic key pair. The authentication code of a certain sensor module 128 and/or monitoring device 108-1 can be used to identify which sensor module 128 and which monitoring device 108 a respective sensor signal is being received by. In addition, the container 104 can have a unique serial number. By linking the monitoring device serial number, the sensor serial numbers and the container serial numbers, in a memory module of the monitoring device 108 for example, the unique serial numbers could be used to maintain a chain of custody of the sensor information for each of the sensor modules 128 associated with a given monitoring device 108-1 and associated with a given shipping container 104.

The wireless module of the monitoring device 108-1 can also communicate information with an operations center subsystem 112 via the communication network 110. Some embodiments could use different wireless media in the wireless module for communication with the sensor modules 128 than the wireless media that is used for communicating with the communication network 110, while others use the same wireless media. The information can include location based messages based on stored reporting behavior profiles, manifest data of contents of the shipping container 104, and/or sensor data received from sensor modules 128 associated with the shipping container 104. Tracking data received by the operations center 112 from the monitoring device 108-1 is stored in a supply chain tracking database 116.

The monitoring device 108-1 can also communicate information over the communication network 110 to a government interface 124. The government interface 124 can be, for example customs, boarder patrol, etc. The government interface 124 allows the relevant governmental officials to access manifest, sensor, chain of custody, tracking information, etc. There can be different information that is made available to different governmental agencies. Some nongovernmental organizations may also have access to certain information, for example, tracking information for a shipper or recipient of cargo. Some embodiments allow the government interface to lock-down access to authorized personnel for a particular storage container.

The monitoring device 108-1 can also communicate with a portable wireless device 120 and/or a local communication network 118. The portable wireless device 120 and/or the local communication network 118 can serve as an intermediary link to the communication network 110 in order for the monitoring device 108-1 to communicate with the operations center 112 or the government interface 124.

In one embodiment, the local communication network 118 is a mesh/adhoc network (e.g., Zigbee). A mesh network is made up of multiple wireless devices that are not situated in permanent and/or well defined locations. Other monitoring devices 108-1 can be the wireless devices, also known as nodes, of the mesh network. Other wireless devices can also make up nodes of the mesh network. Monitoring devices 108-1 will continue to forward a message to other monitoring devices 108, or other nodes, until the message reaches a node that can communicate with the communication network 110. By having multiple monitoring devices 108 able to communicate with each other via the mesh network, monitoring devices 108 that are located deep in the hold of a ship, in a warehouse or buried under other shipping containers 104 in a port or depot can be able to communicate with remote locations such as the operations center subsystem 112 or the government interface 124 via the communication network 110.

The wireless device 120 can be a PDA, a cellular telephone, a satellite telephone or a laptop computer. The wireless device 120 can use a short range wireless system such as Bluetooth, Zigbee (IEEE 802.15.4), infrared, UWB, and/or WiFi to communicate with the monitoring device 108-1. In one embodiment, the wireless device 120 is an RFID (e.g., ISO/IEC 14443) reader that powers at least a portion of the monitoring device 108-1 with an inductive power signal. The wireless device 120 or other device communicating with the active monitoring device 108-1 uses public and/or private keys to authorize and authenticate a communication channel. Once a cryptographically-secure communication channel is configured, communication of commands and data through the communication channel can be performed. In this way, downloading of reporting behavior profiles, data query, etc. can only be performed by authorized devices and/or individuals.

Figure 1B:
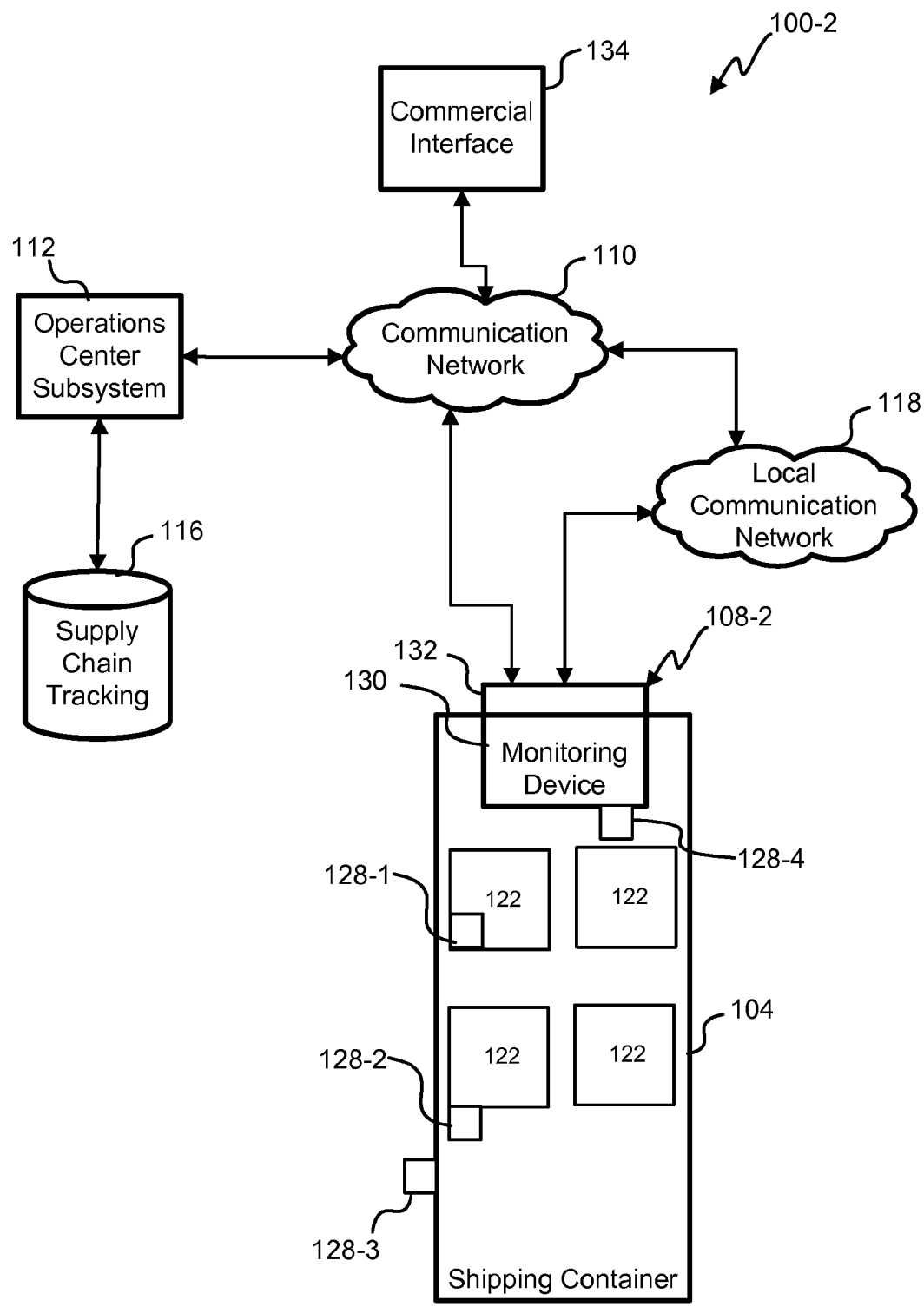
FIG. 1B depicts another example of an active container route management system in which a monitoring device in accordance with the disclosure is utilized.

Referring next to FIG. 1B, another embodiment of an active route management system 100-2 is shown. The route management system 100-2 differs from the route management system 100-1 by including a monitoring device 108-2 than includes an interior portion 130 located inside the container 104 and also includes an exterior portion 132. The various components of the monitoring system can be distributed in either the interior portion 130 or the exterior portion 132. By locating the monitoring device 108-2 at a seam that the doors of the container 104 make with the walls, the floor or the roof of the container 104, a thickness of the interior portion 130 can prevent removal of the monitoring device 108-2 from the container 104 when the container doors are secured.

The route management system 100-2 also includes a commercial interface 134. The commercial interface 134 can run by a business entity that tracks the transport of the container 104. The business entity could be the entity in charge of the distribution of the contents of the container 104 or could be a third party that is responsible for tracking the container 104 during transport. The commercial interface 134 can communicate with the monitoring device 108-2 via the communication network 110 or the local communication network 118 to receive and/or request information from the monitoring device 108-2. The received/requested information can include data regarding a currently active reporting behavior profile, location, sensors, chain of custody, etc. The commercial interface 134 can also communicate information to the monitoring device 108-2 via the local communication network 118 or the communications network 110. The information communicated to the monitoring device 108-2 can include updated or replacement reporting behavior profile information, identification and authentication code information of new sensors to be added to the container 104, or updated operational parameters for reprogramming the reporting behavior of the monitoring device 108-2.

Figure 2:
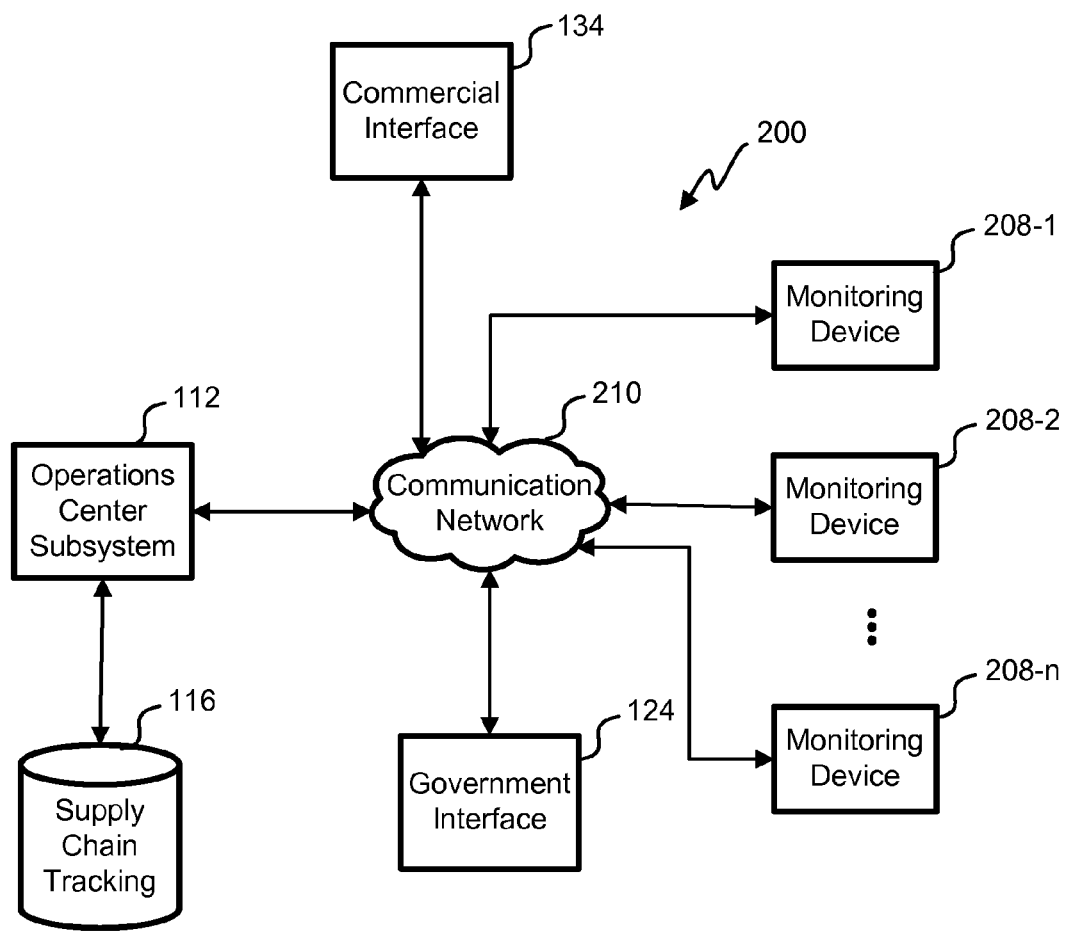
FIG. 2 depicts another example of an active route management system in which monitoring devices in accordance with the disclosure are utilized.

Referring next to FIG. 2, another active route management system 200 includes multiple active monitoring devices 208-1 through 208-n. The monitoring devices 208 can be removably or fixedly attached to one or more shipping containers such as the shipping container 104 of FIG. 1. The monitoring devices 208 can be collocated with the shipping container in a hold of a ship, on a train, in a depot, etc. In addition, the monitoring devices 208 can be located in different geographic locations throughout the world.

The monitoring devices 208 are configured to communicate over a communication network 210 to the operations center 112, the government interface 124 and/or the commercial interface 134. The communication network 210 can include one or more wired and/or wireless networks such as the communication network 110 and/or the local communication network 118 of FIG. 1. As discussed above, the monitoring devices 208 can communicate with each other using a wireless adhoc or mesh network instead of a hub and spoke communication topology. Monitoring devices 208 in a mesh configuration can pass information from other monitoring devices 208, or communications packages 130, until reaching part of the communication network 210 that can pass information to the government interface 124 or operations center subsystem 112.

Figure 3:
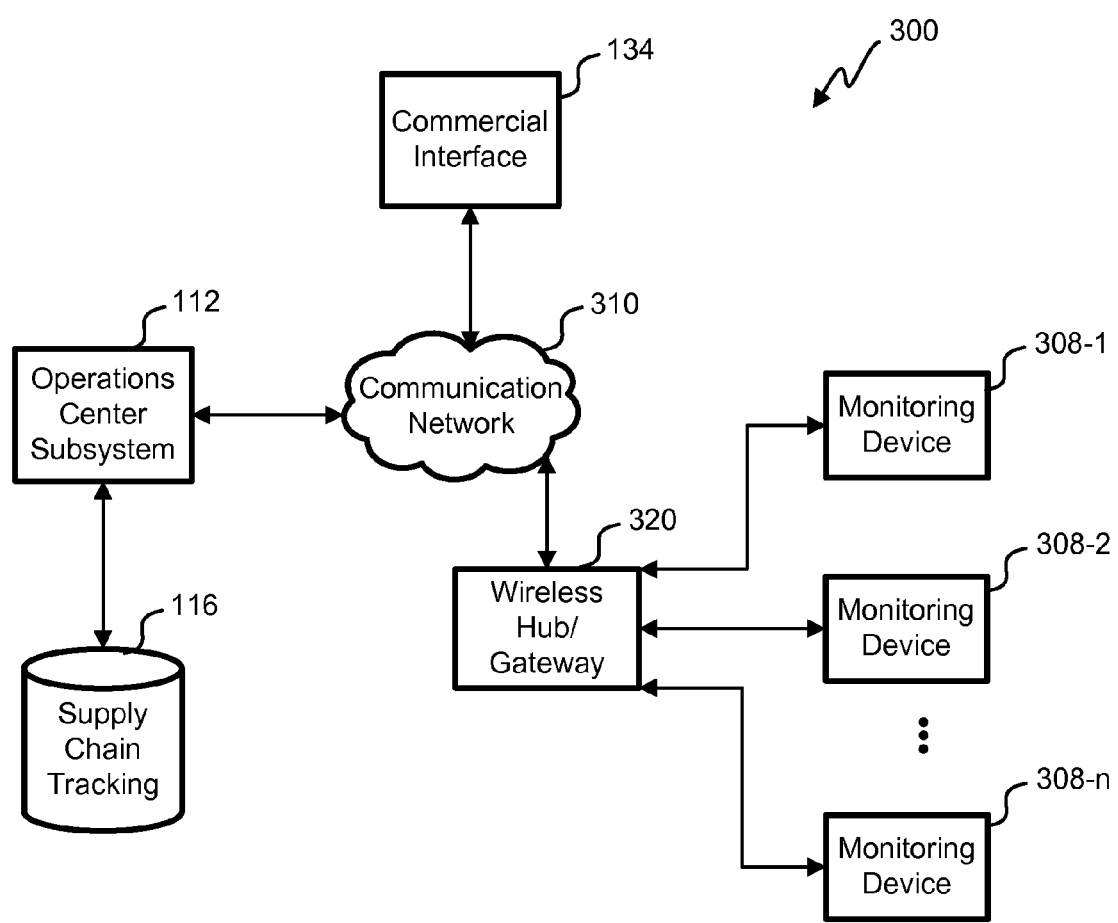
FIG. 3 depicts yet another example of an active route management system in which monitoring devices in accordance with the disclosure are utilized.

Referring next to FIG. 3, another active route management subsystem 300 includes multiple monitoring device 308-1 through 308-n. Unlike the monitoring devices 208 in FIG. 2, the monitoring devices 308 communicate wirelessly with a hub/gateway device 320. The gateway device could be located on a ship, a train or in a port where many monitoring devices 308 are located. The gateway device 320 can serve as an intermediate link between the monitoring devices 308 and a communication network 310 in one embodiment. The gateway device 320 and the monitoring devices 308 can communicate using a LAN utilizing one or more of WiFi (IEEE 802.11 standards), Bluetooth, or Zigbee (802.15.4). The gateway device 320 can communicate via the communication network 310 using one or more of cellular (e.g., CDMA, TDMA, GSM, etc.), RFID, satellite (e.g., Comsat or Iridium), and/or infrared transceivers.

The gateway device 320 can communicate with the monitoring devices 308 one at a time or as a group. The wireless device 320 establishes secure communications links with the monitoring devices 308 in order to issue commands (e.g., wakeup signals or report requests), and to communicate data to and from the monitoring devices 308. A secure communication link with the communication network 310 could alternatively be used. For example, the portable wireless device 320 could communicate with active monitoring devices 308 indirectly though the communication network 310.

Data communicated to the monitoring devices 308 can include programming parameters affecting how the monitoring devices 308 function, or reporting behavior profile information determining how the monitoring devices report, e.g., due to location changes or sensor changes. Data retrieved from the monitoring device 308 can include log data including times, locations and sequence of events such as sensor readings. The data retrieved from the monitoring devices 308 can also include manifest information regarding the contents of a container that the monitoring device is securing.

The gateway device 320 can forward information received from the monitoring device 308 to the operations center 112 and/or the commercial interface 134 via the communication network 310. The information is tied to an authentication information such as an address, serial number, or cryptographic key, of an active monitoring device 308, a shipping container 104, and/or individual sensors 128. By knowing the address, serial number, or cryptographic key, the shipping container 104 can be verifiably tied to specific active monitoring devices 308 and sensors 128. By verifying that the correct authentication information is associated with the correct shipping container 104, chain-of-custody can be established. For example, if a sensor 128 were switched out with a faulty one after securing the shipping container 104, the sensor 128 would report an incorrect address or serial number such that authentication would fail.

Figure 4:
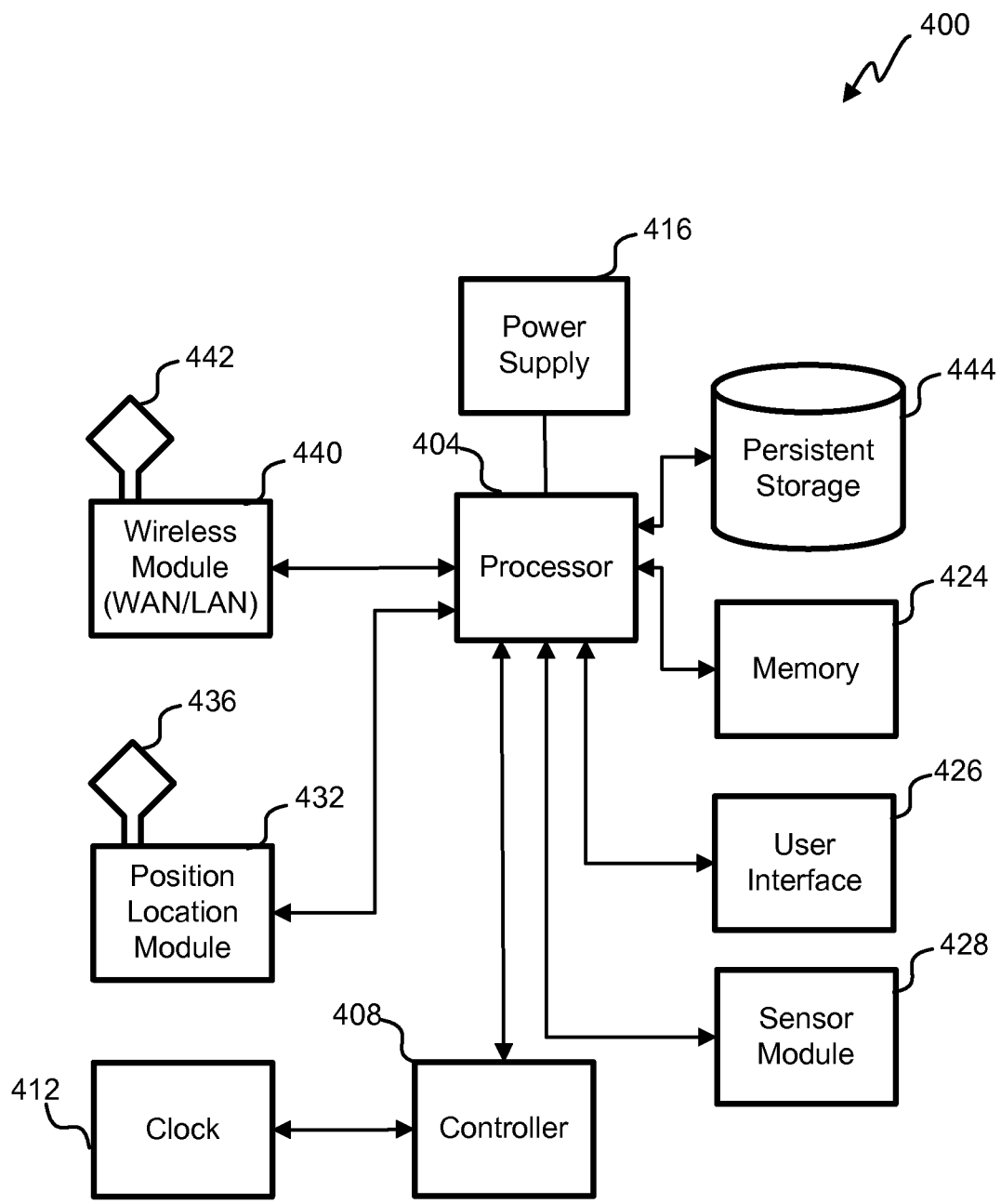
FIG. 4 is a functional block diagram of an embodiment of a monitoring device in accordance with the disclosure.

Referring next to FIG. 4, a block diagram of an embodiment of a monitoring circuit 400 is shown. The monitoring circuit 400 can be part of any of the monitoring devices 108, 208 or 308 discussed above. The monitoring circuit 400 includes a processor 404, a controller 408, a clock 412, a power supply 416, a memory 424, a user interface 426, a sensor module 428, a position location module 432, a wireless module 440, and persistent storage (e.g., Flash, ROM or some other non-volatile memory) 444.

The processor 404 is a programmable device, e.g., a central processing unit (CPU), such as those made by Intel® Corporation or AMD®, a microcontroller, an application specific integrated circuit (ASIC), a field programmable gate array (FPGA), and/or logic gates etc. The memory 424 and/or the persistent storage 444 includes random access memory (RAM) and/or read-only memory (ROM). The memory 424 and/or the persistent storage 444 store a computer program product comprising computer-readable, computer-executable software code containing instructions that are configured to, when executed, cause the processor 404 to perform various functions described herein. Alternatively, the software may not be directly executable by the processor 404 but configured to cause the processor 404, e.g., when the instructions are compiled and executed, to perform the functions described.

The persistent storage 444 can be used to store reporting behavior profiles, and/or sensor data received from sensor modules associated with a shipping container that the monitoring device is securing. The reporting behavior profiles stored in the persistent storage 444 include parameters that determine how the processor 404 causes other modules of the monitoring circuit 400 to perform various functions (e.g., periodic wakeup times, alarm trigger thresholds, etc.).

The controller 408 is coupled to the processor 404. The controller 408 can be a microcontroller or a state machine, depending on the complexity of the functions being performed by the controller 408. The controller 408 is coupled to the clock 412. In a sleep mode, the majority of the monitoring circuit 400 except a portion of the controller 408 and the clock 412 is powered off. The controller 408 is configured to determine, based on timing data received from the clock 412 and duty cycle parameters defined by the reporting behavior profile, to wake up and power up the other portions of the monitoring circuit 400.

The power supply 416 includes one or more batteries. During normal operating conditions, power is supplied, directly or indirectly (e.g., via the processor 404) to the various modules of the monitoring circuit 400 via the batteries of the power supply 416 The power supply 416 can also include one or more backup batteries as well as an inductive power supply. The inductive power supply is configured to receive a wireless power signal from an external source, such as an RFID reader device, or another device associated with the container. The external source could be one of the sensor modules 128 or the portable wireless devices 120, for example. The power signal can be received from wireless power sources installed at weigh stations, ports, depots, and other areas where shipping containers are located for extended periods of time. The external source supplies a wireless power signal that is received by an inductive antenna of the inductive power supply and inductively converted into electrical power.

The user interface 426 can include one or more input devices and/or one or more output devices. Input devices can include one or more buttons, toggle switches, dials, etc. Output devices can include lights (e.g., LEDs, LCDs, OLEDs, etc.), a display panel and/or an audio output. In some embodiments, the user interface 426 is only available during manufacture and test. In the field, the monitoring circuit 400 is sealed within the enclosure of the monitoring device. In one embodiment, the enclosure is sealed such that there are no wired interfaces to any portions of the monitoring circuit 400. A PDA is used to wirelessly communicate with the user interface and provide a soft interface to the monitoring circuit 400.

The sensor module 428 can include passive sensors or active sensors. Passive sensors require no power to sense and record a change in a condition and can be analyzed/queried at a later date to determine if the condition has changed. The passive and active sensors could be located inside the monitoring device, on the outside of the shipping container, on the inside of the shipping container, and/or attached to the cargo. Active sensors require a power source and detect changes continually or intermittently. Active sensors can be battery powered, powered from the container, powered with a wire from the monitoring device, and/or wirelessly powered using RF fields supplied by a wireless power signal.

The sensor module 428 can include sensors configured to detect the presence of the shipping container. For example, sensors could include a door sensor configured to detect the door(s) of the shipping container and/or verify that the doors are closed.

The sensor module 428 could also include sensors for detecting temperature, pressure, humidity, radiation (e.g., light or RF) or any CBRNE measurements. Accelerometers and/or strain gauges could also be included in the sensor module 428 in order to detect an attempt to forcibly remove the monitoring device from the shipping container (e.g., with a crowbar) or excessive movement that could damage the cargo.

The position location module 432 provides a location of the monitoring circuit 400 to the controller 408. The position location module 432 can be a GPS receiver. A GPS receiver is configured to receive signals, via a GPS antenna 436, from a plurality of GPS satellites in order to determine the global location of the monitoring device. Instead of, or in addition to GPS, other types of navigation systems such as GLONASS (Russia), Galileo, Beidou (China), WiFi assisted location systems, and/or cellular (e.g., GSM, CDMA, TDMA) based location systems can also be used.

The wireless module 440 includes one or more wireless communication systems including WiFi (IEEE 802.11 standards), Bluetooth, Zigbee, cellular (e.g., CDMA, TDMA, GSM, etc.), WiMax (802.16), RFID (e.g., ISO/IEC 14443), satellite (e.g., Comsat), or infrared. The wireless module 440 includes one or more wireless antenna 442. In one mode, the wireless module 440 can use short range wireless (e.g., Bluetooth, Zigbee or WiFi) to communicate with sensor modules on/in the shipping container or to communicate with a local network. In another mode, the wireless module 440 can use longer range communication links such as cellular, satellite, WiMax, etc., to communicate with the communication network 310 and/or portable hub/gateway device 320. In some embodiments, the wireless antenna 442 (or the GPS antenna 436) is part of the monitoring device that is used for other purposes (e.g., the housing).

The power from an inductive power supply, if one is present in the power supply 416, can be used to wakeup and/or power any of the components of the monitoring circuit 400. Components that can be powered by the inductive power supply can include the processor 404, the controller 408, the clock 412, the sensor module 428, the wireless module 440 and/or the persistent storage 444. Depending on the function being performed, the voltage of the inductive power supply can be selectively supplied to any of these components. For example, the inductive power supply can used instead of a backup battery to provide power to the controller 408 and the clock 412 during sleep mode periods. The inductive power supply can also be used to power the persistent storage 444 to retrieve previously stored reporting behavior profiles The persistent storage 444 could include a low power microcontroller that is powered by the inductive power supply. In some embodiments, the sensor module(s) or other systems of the shipping container wirelessly power the monitoring circuit 400.

The monitoring circuit 400 is exemplary only and other monitoring circuits can include more or fewer components, depending on the way in which functions are distributed among the other components of the route management system in which the monitoring circuit is being employed. In any given system, functions can be provided by various subsystems including, a monitoring device subsystem, a sensor subsystem associated with the container or contents within the container, or a communication subsystem coupled to or integrated with the container.

Figure 5A:
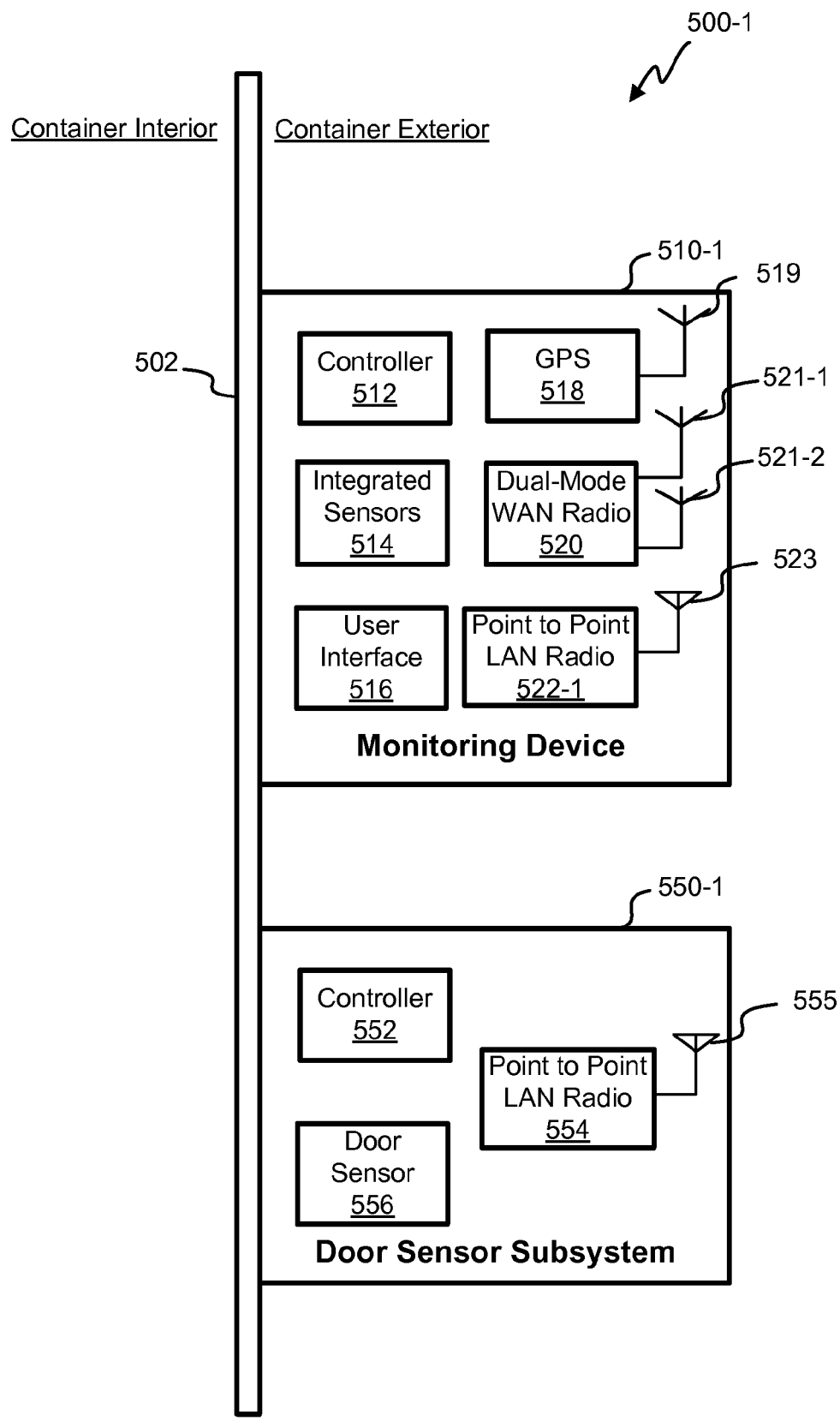
FIGS. 5A, 5B, 5C 5D, 5E and 5F are functional block diagrams of systems used for monitoring and reporting tracking related events at a container in a route management system in accordance with the disclosure.

Referring next to FIG. 5A, a route management system 500-1 includes a monitoring device 510-1 and a door sensor subsystem 550-1. In the route management system 500-1, the monitoring device 510-1 is mounted exterior to a container on a container panel 502. The panel 502 can be a door panel, a wall panel, a floor panel or a roof panel. The monitoring device 510-1 is an example of the monitoring device 108-1 as illustrated in FIG. 1. The monitoring system 510-1 includes a controller 512, an integrated sensor module 514, a user interface 516, a GPS receiver 518, a dual-mode WAN radio 520 and a point-to-point LAN radio 522-1. The monitoring system 510-1 can also include one or more other components of the monitoring system 400 illustrated in FIG. 4 such as, for example, the processor 404, the power supply 416, the memory 424, the clock 412 and the persistent storage 444.

The controller 512 is coupled to the other components of the monitoring system 510-1, directly or indirectly. The controller 512 can be a microcontroller or a state machine, depending on the complexity of the functions being performed by the controller 512. The controller 512 uses reporting behavior profiles to determine when to perform functions such as monitoring the sensors of the sensor module 514, receiving location information from the GPS receiver 518 and receiving or transmitting messages via the dual-mode WAN radio 520 or the LAN radio 522-1.

The sensor module 514 can include one or more sensors such as, for example, a power supply sensor, a duty-cycle control sensor, a tilt sensor, an accelerometer, a mechanical tamper sensor, a motion sensor, etc. The sensors can be passive or powered by the power supply of the monitoring device 510-1. The user interface can include one or more input devices and/or one or more output devices. Input devices can include one or more buttons, toggle switches, dials, etc. Output devices can include lights (e.g., LEDs, LCDs, OLEDs, etc.), a display panel and/or an audio output.

The GPS receiver 518 receives signals, via a GPS antenna 519, from a plurality of GPS satellites in order to determine the global location of the monitoring device. The global location, or data representative of the signals from the GPS satellites, is forwarded to the controller 512. The dual-mode WAN radio 520 includes one or more cellular radio subsystems (e.g., CDMA, TDMA or GSM) and one or more satellite radio subsystems (e.g., Comsat or Iridium). The cellular radio is coupled to a cellular antenna 521-1 and the satellite radio is coupled to a satellite antenna 521-2. The LAN radio 522-1 includes one or more of WiFi (IEEE 802.11 standards), Bluetooth (IEEE 802.15.1 standards) and/or Zigbee (IEEE 802.15.4 standards). The LAN radio is coupled to a first LAN antenna 523.

The door sensor subsystem 550-1 is located on the exterior of the container panel 502 and is detached from the monitoring device 510-1. The door sensor subsystem 550-1 includes a door sensor controller 552, a point-to-point LAN radio 554 and a door sensor 556. The door sensor controller 552 is coupled to the point-to-point radio 554 and the door sensor 556. The door sensor controller 552 can be a microcontroller or a state machine. The door sensor controller 552 receives sensor data from the door sensor 556. The sensor data is indicative of a closed and/or open state of the doors of the container. The door sensor controller 552 monitors the state of the door sensor 556 and stores data indicative of the state of the door sensor 556 in memory (not shown) coupled to the door sensor controller 552.

The LAN radio 554 of the door sensor subsystem 550-1 communicates with the LAN radio 522-1 of the monitoring system 510-1 using a short range wireless systems (e.g., one or more of WiFi, Bluetooth and/or Zigbee). The door sensor LAN radio 554 is coupled to a second LAN antenna 555. The door sensor LAN radio 554 communicates information indicative of states of the door sensor 556 to the LAN radio 522-1 of the monitoring system 510-1. The controller 512 of the monitoring device 510-1 communicates the data indicative of the state of the door sensor to one or more of the operations center 112, the government interface 124 or the commercial interface 134 in accordance with parameters contained in the reporting behavior profiles of the monitoring device 510-1. The controller 512 causes one of the dual-mode WAN radio transmitters, e.g., cellular or satellite, to initiate transmission of the door sensor data and/or data associated with sensors in the sensor module 514. The controller 512 determines which of the dual-mode radios to use based on criteria such as, for example, signal strength, location, cost of transmission, etc. The transmissions can be periodic, in response to a signal received from a remote location, or in response to a change in state of the one or more of the sensors, depending on the parameters of the reporting behavior profile(s) that is being utilized.

Figure 5B:
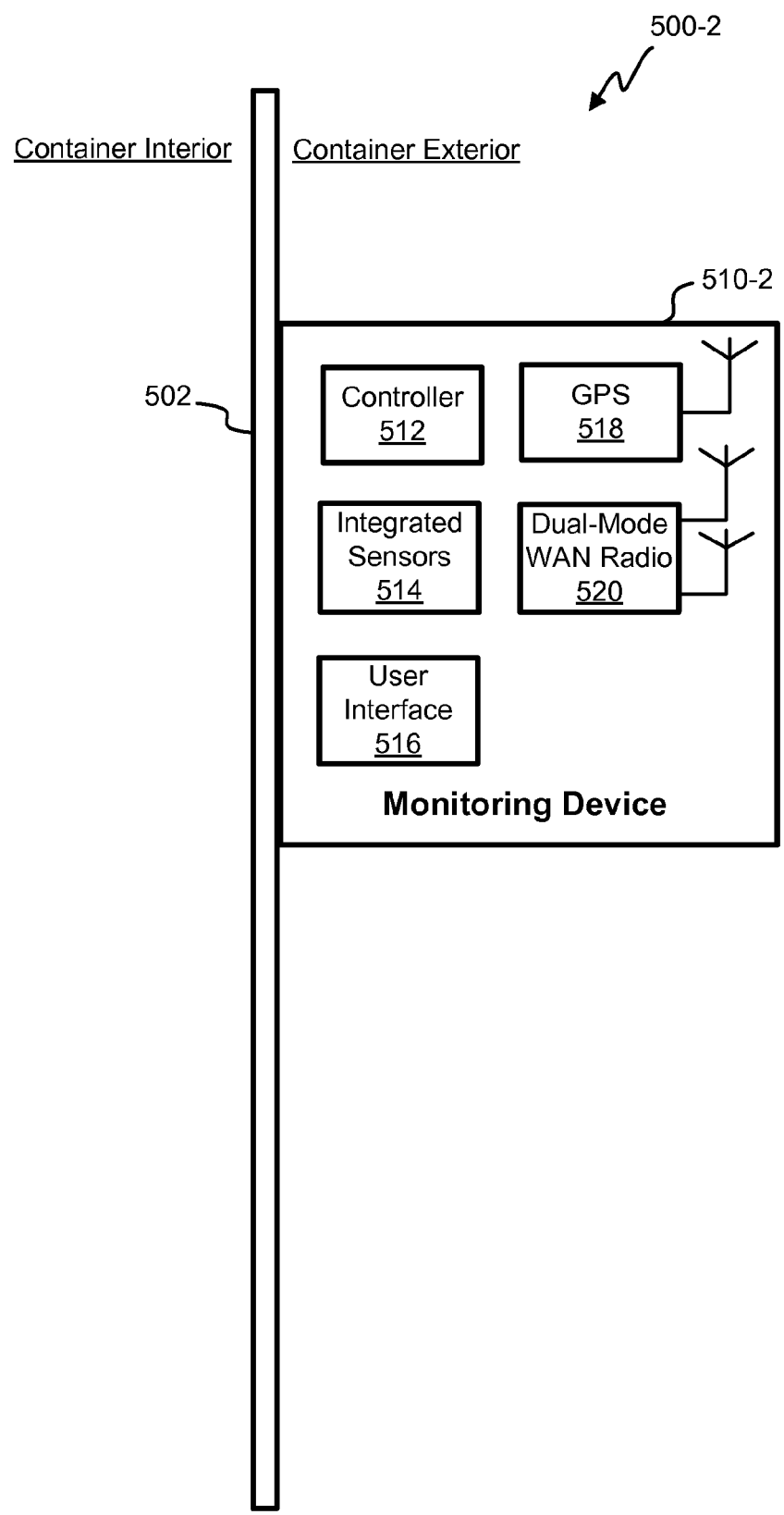

Referring next to FIG. 5B, another route management system 500-2 includes a monitoring device 510-2. The route management system 500-2 differs from the route management subsystem 500-1 in that the monitoring device 510-1 operates without additional subsystems. The components of the monitoring device 510-2 are similar to the respective components of the monitoring device 510-1 and include the controller 512, the sensor module 514, the user interface 516, the GPS receiver 518 and the dual-mode WAN radio 520. In addition, the monitoring device 510-2 can include other components illustrated in FIG. 4 including, for example, the processor 404, the power supply 416, the memory 424, the clock 412 and the persistent storage 444.

The controller 512 of the monitoring device 510-2 receives sensor data from the integrated sensor module 514. The sensor module 514 can include any of the sensors of the sensor module 514 of the monitoring system 510-1. In addition, the sensor module 514 can include a door sensor that monitors the state of one or both doors of the container. The controller 512 causes the dual-mode WAN radio 520 to communicate data from the sensors of the sensor module 514 to remote locations such as the operations center 112, the government interface 124 or the commercial interface 134. One or more reporting behavior profiles stored in memory of the monitoring device 510-2 determine when the transmissions occur. Other functions performed by the monitoring device 510-2 are similar to the functions performed with the similar components of the monitoring device 510-1.

Figure 5C:
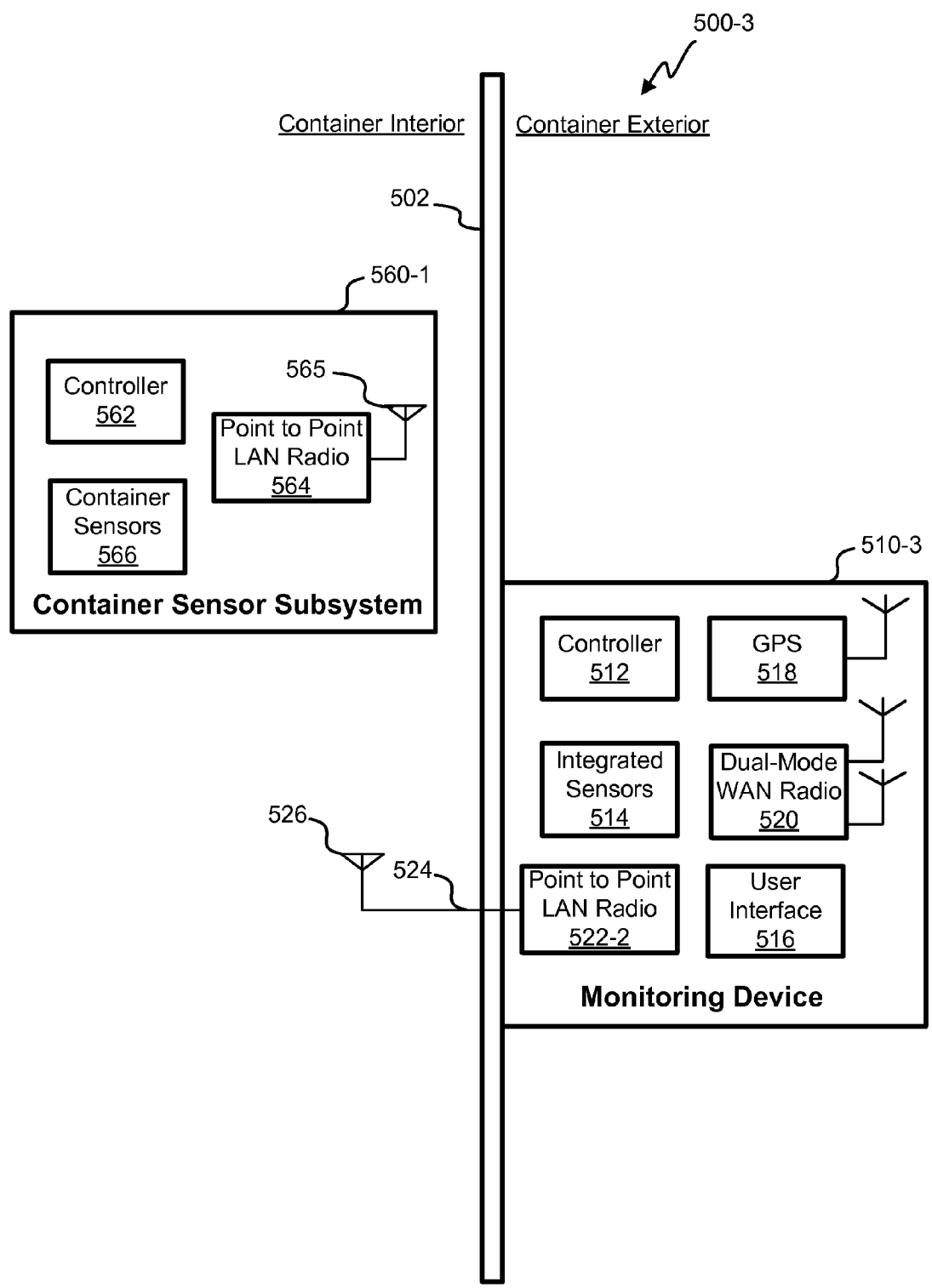

Referring next to FIG. 5C, another route management system 500-3 includes a monitoring device 510-3 and a container sensor subsystem 560-1. The monitoring device 510-3 is similar to the monitoring system 510-1 except in regard to the LAN radio 522. The LAN radio 522-2 of the route management system 510-3 is coupled to a LAN antenna 526 on the interior of the container. The LAN antenna 526 is coupled to the LAN radio 522 via a wired connection 524.

The container sensor subsystem 560-1 is located on the interior of the container panel, although some sensors associated with the container sensor subsystem 560-1 can be located outside of the container, and is detached from the monitoring device 510-3. The container sensor subsystem 560-1 includes a container sensor controller 562, a point-to-point LAN radio 564, coupled to a LAN antenna 565, and container sensor module 566. The container sensor controller 562 is coupled to the point-to-point LAN radio 564 and the container sensor module 566. The container sensor controller 562 can be a microcontroller or a state machine. The container sensor controller 562 receives sensor data from the container sensor module 566. The sensor data is indicative of various states of the environment of the container and/or states of various freight in the container. The container sensor controller 562 monitors the state of the sensors in the container sensor module 566 and stores data indicative of the states of the sensors in memory (not shown) coupled to the container sensor controller 562. The sensors of the container sensor module 566 can include one or more of the sensors 128 discussed above in reference to FIGS. 1A and 1B.

The LAN radio 564 of the container sensor subsystem 560-1 communicates with the LAN radio 522-2 of the monitoring system 510-3 using a short range wireless system (e.g., one or more of WiFi, Bluetooth and/or Zigbee). The container LAN radio 564 is coupled to a second LAN antenna 565. The container sensor LAN radio 564 communicates information indicative of states of the various sensors of the sensor module 566 to the LAN radio 522-2. The controller 512 of the monitoring device 510-3 performs similar functions as the controller 512 of the monitoring devices 510-1 and 510-2 discussed above.

Figure 5D:
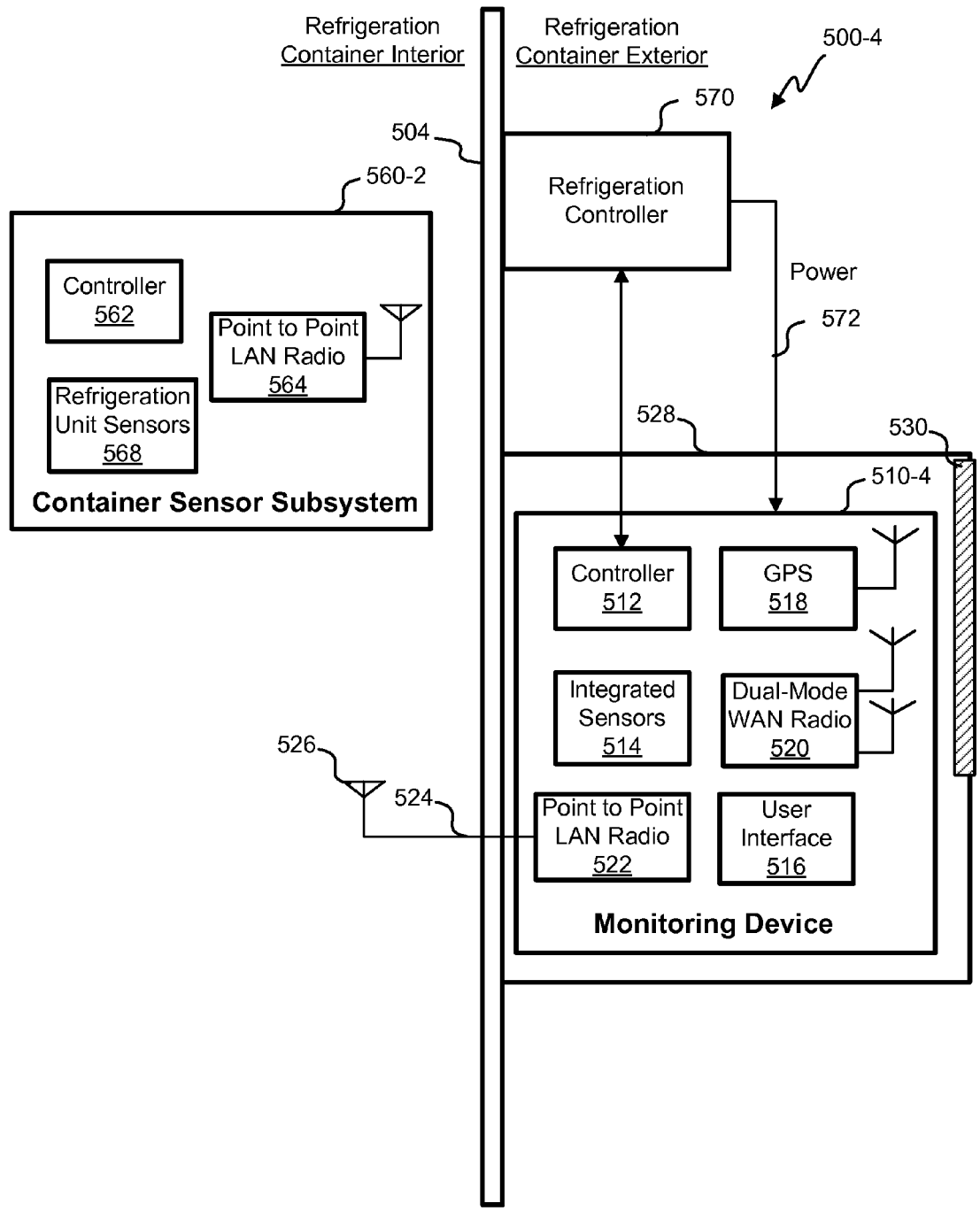

Referring next to FIG. 5D, another route management system 500-4 is associated with a refrigeration container that includes a refrigeration controller 570. The Monitoring device 510-4, and the container sensor subsystem 560-2 are similar to the monitoring device 510-3 and the container sensor subsystem 560-1, respectively, of the route management system 500-3. However, the monitoring device 510-4 is at least partially enclosed within an external mounting panel 528. The mounting panel 528 includes an RF transparent window 530 that allows RF signals to pass through. This enables the GPS receiver 518 and the dual-mode WAN radio to receive and/or transmit signals outside of the mounting panel 528.

The refrigeration controller 570 controls the refrigeration functions of the container to maintain a desired temperature and humidity. The refrigeration controller also provides power to the monitoring device 510-4 via a power link 572. The refrigeration controller 570 also provides data indicative of the environment of the refrigeration unit to the controller 512. The information received from the refrigeration controller 570 can be communicated to a remote location, or at least cause the controller 512 to initiate transmission of a message to the remote location, depending on the parameters of the reporting behavior profile(s).

The container sensor subsystem 560-2 includes a refrigeration sensor module 568. The refrigeration sensor module 568 can include more sensors configured to sense the environmental conditions of the refrigeration unit as a whole, or to sense conditions of individual pieces of freight contained in the refrigeration unit.

Figure 5E:
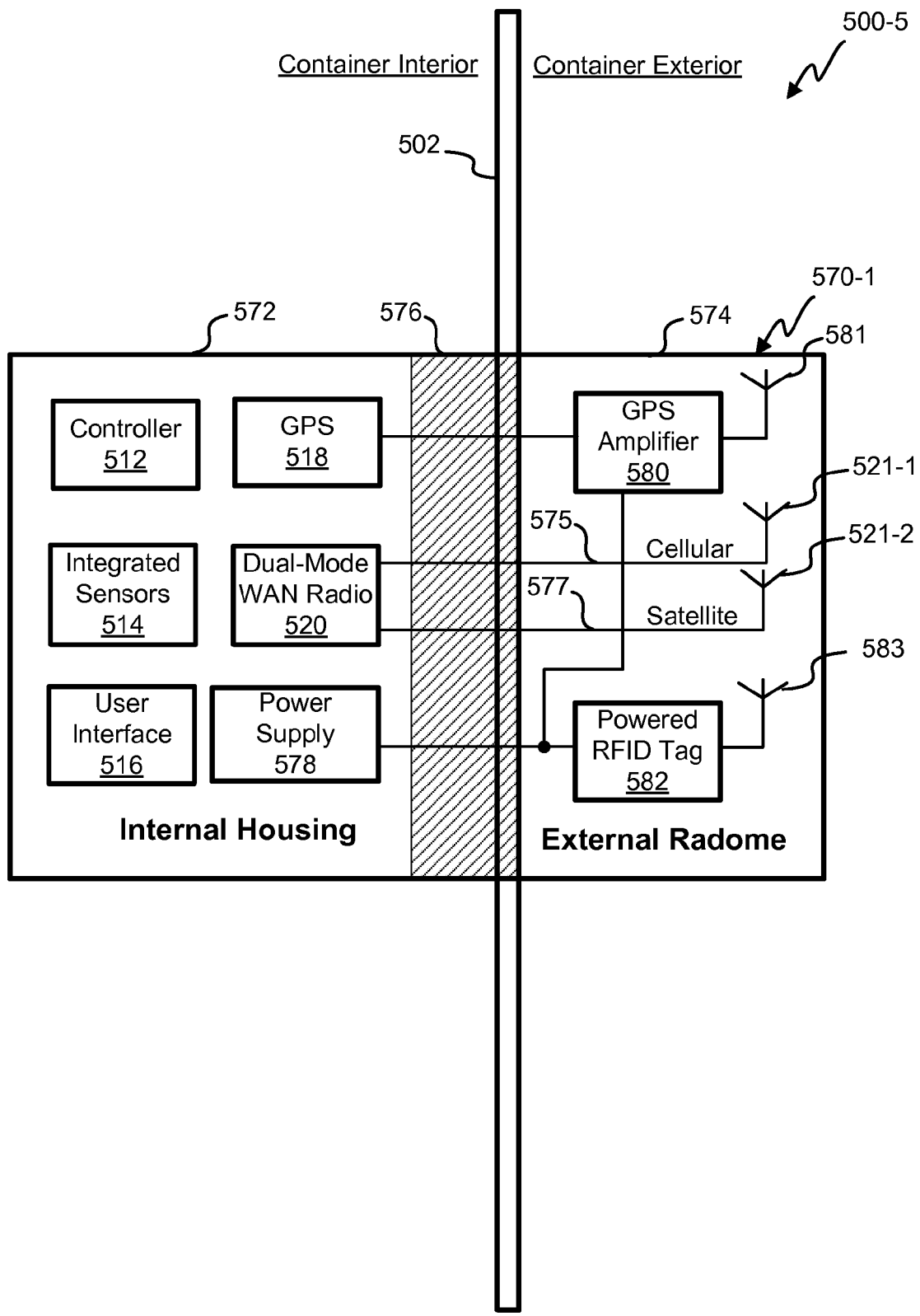

Referring to FIG. 5E, a route management system 500-5 includes a monitoring device 570-1. The monitoring device 570-1 is an example of the monitoring device 108-2 shown in FIG. 1B which is mounted at a seam that the doors of the container 104 make with the walls, the floor or the roof of the container. The monitoring device 570-1 includes an internal housing 572, an external radome 574 and a coupling section 576 coupling the internal housing 572 and the external radome 574. The controller 512, the sensor module 514, the user interface 516, the GPS receiver 518 and the dual-mode WAN radio 520 are similar to the respective components discussed above in reference to FIGS. 5A, 5B, 5C and 5D. The monitoring system 570-1 also includes a power supply, e.g., one or more batteries, housed in the internal housing 572. The monitoring system 570-1 can also include one or more other components of the monitoring system 400 illustrated in FIG. 4 such as, for example, the processor 404, the memory 424, the clock 412 and the persistent storage 444.

The external radome 574 houses a GPS amplifier 580 which is coupled to a GPS antenna 581. The GPS amplifier 580 is electrically coupled to and powered by the power supply 578. The GPS amplifier 580 amplifies the received signals from the GPS satellites and provides these amplified signals to the GPS receiver 518.

The external radome 574 houses the cellular antenna 521-1 and the satellite antenna 521-2 which are coupled to the dual-mode radio 520 via a first wired connection 575 and a second wired connection 577, respectively. The external radome 574 also houses a powered RFID tag 582. The RFID tag 582 can be part of the user interface subsystem 426 discussed above in reference to FIG. 4. The RFID tag 582 is configured to be powered by an RF signal from, for example, a PDA or other mobile device in order to activate at least a portion of the subsystems of the monitoring device 570-1.

Figure 5F:
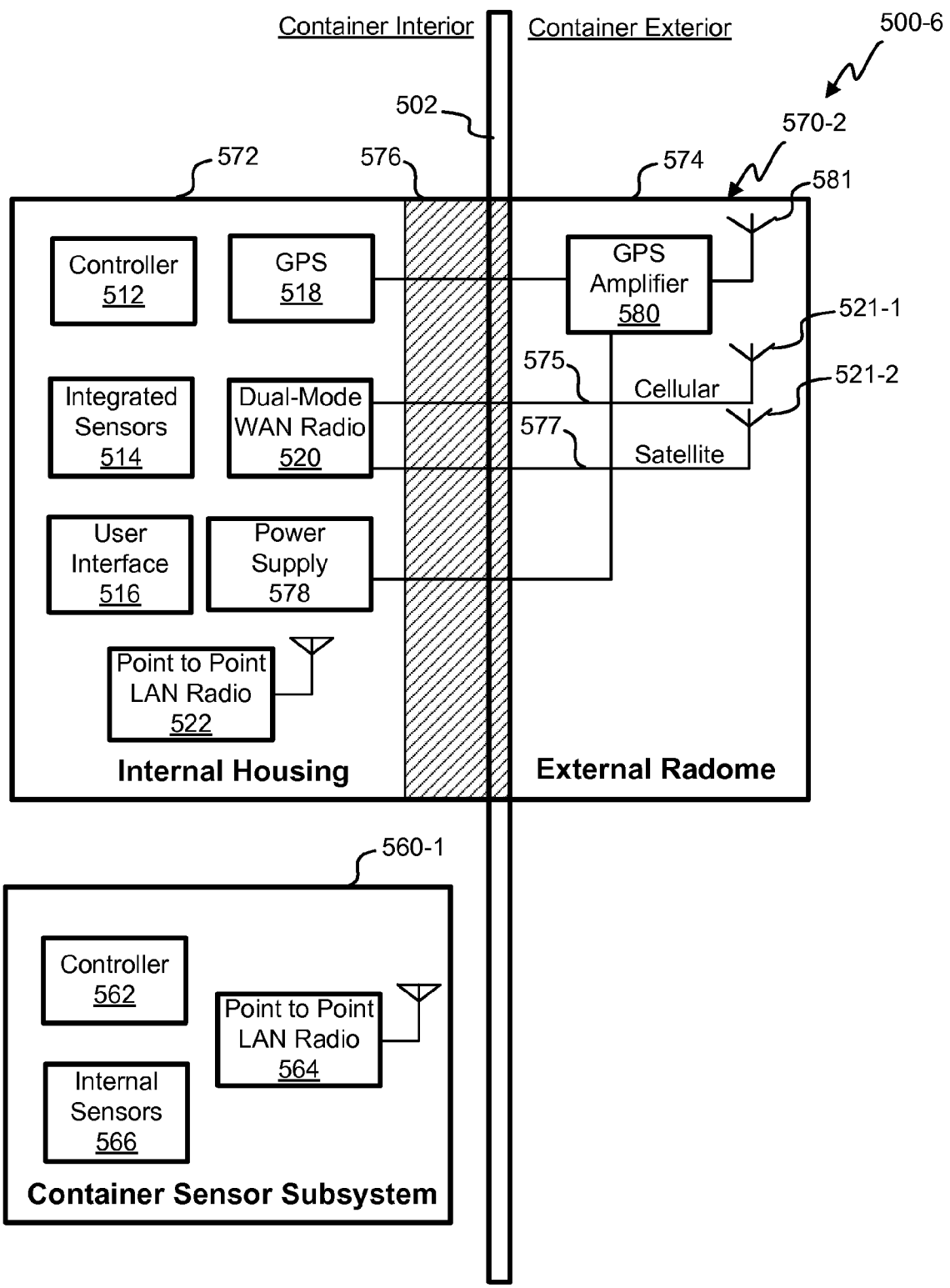

Referring to FIG. 5F, yet another route management system 500-6 includes a monitoring device 570-2 and the container sensor subsystem 560-1 as discussed above in reference to FIG. 5C. The monitoring device 570-2 is similar to the monitoring device 570-1 of FIG. 5E, except there is no RFID tag 582 in the external radome 574, and a LAN radio 522 is housed in the internal housing 572. The monitoring device 570-2 and the container sensor subsystem interact similarly and perform similar functions as the monitoring device 500-3 and the container sensor subsystem 560-1.

The route management systems 500 shown in FIGS. 5A-F are exemplary only and are not limiting. The components shown in the monitoring devices 510 and 570 and the sensor subsystems 550 and 560 can be rearranged or omitted. Other components can also be added.

Operations Center Systems for Performing Route Management

Figure 6:
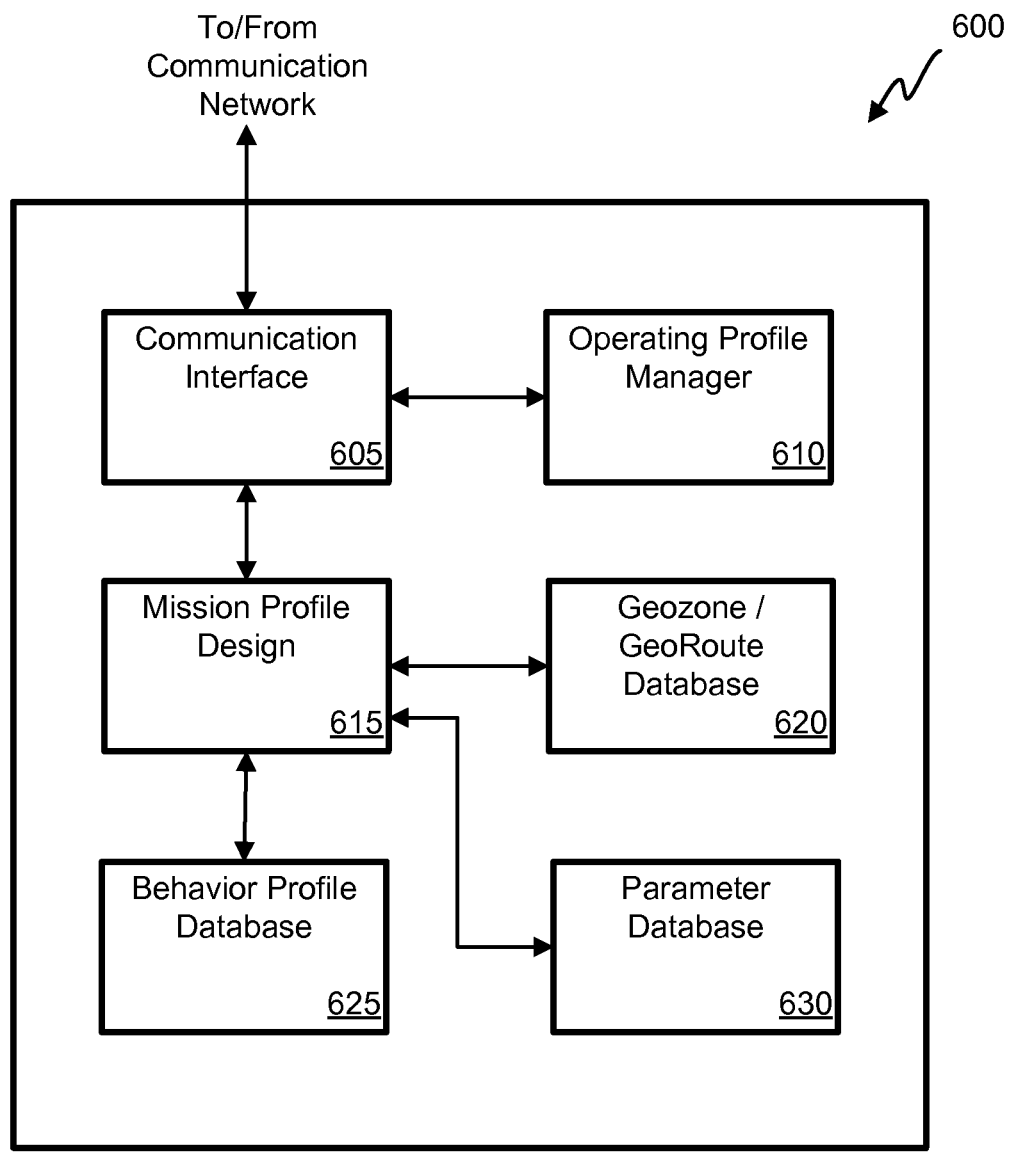
FIG. 6 is a functional block diagram of subsystems contained in an embodiment of an operations center for performing route management in accordance with the disclosure.

Referring to FIG. 6, an operations center 600 includes subsystems shown for performing route management in association with one or more monitoring devices. The subsystems include a communication interface 605, an operating profile manager 610, a mission profile design system 615, and databases including a geo-zone database 620, a behavior profile database 625 and a parameter database 630. The operations center 600 can be implemented on one or more server computers connected to one or more communication networks, such as the communication networks 110, 210 and 310, via the communication interface 605. The operations center 600 can be located at the operations center subsystem 112, or alternatively, at the government interface 124 and/or the commercial interface 134 shown in FIGS. 1A, 1B and 1C.

The communication interface 605 can communicate with the government interface 124 or the commercial interface 134 to provide users from these interfaces with access to the subsystems of the operations center 600. The users of the government and/or commercial interfaces 124 and 134 can use the subsystems of the operations center to design mission profiles for individual monitoring devices of for a group of monitoring devices. The communication interface 605 can also communicate directly with monitoring devices to download new and/or updated mission profiles to the monitoring devices.

The operating profile manager 610 organizes mission profile information that is stored in the databases 620, 625 and 630. The operating profile manager 610 stores information indicating which mission profiles for which customers are stored in the databases 620, 625 and 630. In addition, the operating profile manager 610 stores information indicating which mission profiles for which customer are currently stored in which monitoring devices.

The operating profile manager 610 coordinates the updating or changing of mission profiles between the operations center 600 and any monitoring devices. A user can initiate a session with the operating profile manager to modify existing mission profiles and/or to create new mission profiles, and to communicate the modified and/or new mission profiles to selected monitoring devices.

The mission profile design system 615 interacts with users, e.g., of the government or commercial interfaces 124 or 134, in updating and/or designing mission profiles. The mission profile design system 615 is configured to retrieve existing information and store new information in the geo-zone database 620, the behavior profile database 625 and the parameter database 630.

The geo-zone database 620 stores information indicative of various geo-zone segments, such as rectangular segments, circular segments and racetrack segments (a combination of two circles and a rectangle). The geo-zone segments can be stored in hierarchical geographies including groups of segments such as routes, sub-areas within larger areas, etc.

The behavior profile database 625 stores information indicative of different behaviors that determine how a monitoring device functions. The behavior profiles can include information indicative of various functions performed by the monitoring devices including, but not limited to, the behaviors listed in Table 1.

TABLE 1

Report rate, location determination rate, logging rate, and sensor sampling rates.
GPS Lockout, GPS acquisition mode, Ping mode,
Report generation when exiting and/or entering a geo-zone.
Quiet mode, quiet except alert mode.
Arm, Disarm, Turn unit off
Sensor enables, sensor disables and sensor alerts.

The parameter database 630 stores information indicative of specific design parameter values of behavior variables that determine how the behavior profiles cause the monitoring device to function. Design parameters that can be affected by the parameter values can include, but are not limited to, the design parameters listed in Table 2.

TABLE 2

Wireless Subsystem (WSS) parameters.
Motion Sensor management parameters.
Thresholds for temperature, humidity, light, door detection, and other sensors.
Adaptive refrigeration unit monitoring thresholds.
Radio selection order (primary, secondary, tertiary) and radio timeout values.
Minimum acceptable GPS fix criteria (e.g., number of satellites, DOP)
GPS Acquisition Mode
Number of GPS retries before switching to Default GeoArea operation.
Power state management parameters.

The mission profile design system 615 can manage many mission profiles for different customers separately. The different profiles can be mapped to different geo-zones, behavior profiles and parameters stored in the databases 620, 625 and 630, respectively. The different mission profiles can refer to the same geo-zones, behavior profiles and parameters such that redundant information does not waste memory (both the memory of the databases 620, 625 and 630 and the respective databases in a monitoring device).

Monitoring Device Systems for Performing Route Management

Figure 7:
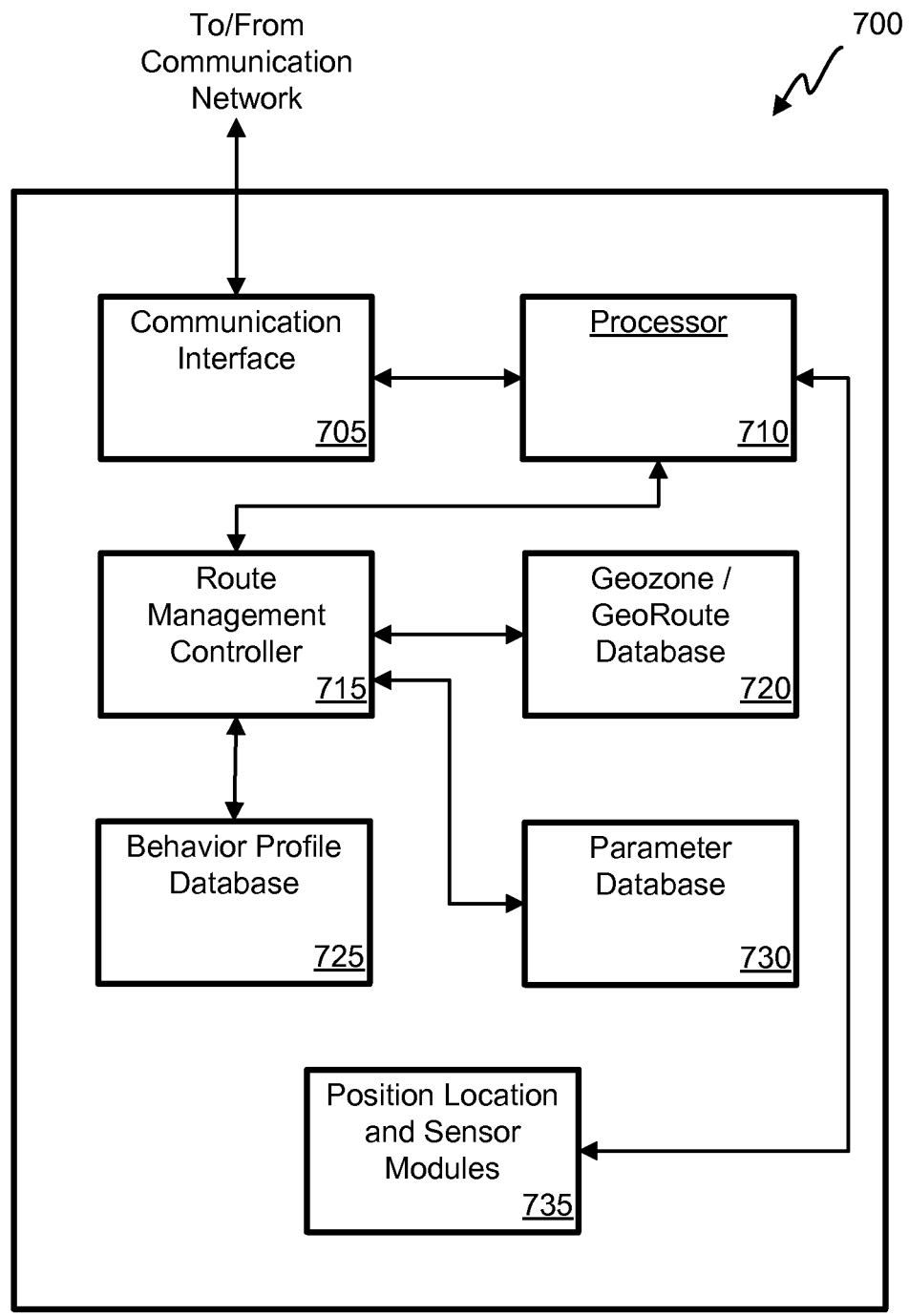
FIG. 7 is a functional block diagram of subsystems contained in an embodiment of a monitoring device for performing route management in accordance with the disclosure.

Referring to FIG. 7, a monitoring device 700 includes subsystems shown for performing route management. The subsystems include a communication interface 705, a processor 710, a route management controller 715, databases including a geo-zone database 720, a behavior profile database 725 and a parameter database 730, and position location and sensor modules 735.

The communication interface 705 can include one or more WAN radios and/or LAN radios. The communication interface 705 can communicate with the operations center 600, directly or indirectly, via the communication networks 110, 210 and/or 310. The monitoring device 700 can initiate communication with the communication interface to report alerts, sensor data, location updates and other reports, as determined by the mission profiles stored in the monitoring device 700. The monitoring device 700 can receive mission profiles, new and/or updated, via the communication interface 705. The download of mission profile information can be initiated by the operation center 600, or by the monitoring device 700.

The processor 710 can be the same as the processor 404 in FIG. 4. The processor 710 is a programmable device, e.g., a central processing unit (CPU), such as those made by Intel® Corporation or AMD®, a microcontroller, an application specific integrated circuit (ASIC), a field programmable gate array (FPGA), and/or logic gates etc. The processor 710 receives position location and sensor data from the position location and sensor modules 735 and communicates this data to the route management controller 715. Multiple processors 710 could be utilized in some embodiments.

The route management controller 715 is coupled to the geo-zone database 720, the behavior profile database 725 and the parameter database 730. The route management controller 715 can be the same as or a subset of the controller 408 discussed above in reference to FIG. 4. Based on which mission profile, or profiles, is/are active, the route management controller 715 retrieves the geo-zone, behavior profile and parameter information from the respective geo-zone database 720, the behavior profile database 725 and the parameter database 730.

The databases 720, 725 and 730 contain mission profile information that has been previously downloaded from the operations center 600 or was loaded at the time the monitoring device 700 was first activated. The geo-zone database 720, the behavior profile database 725 and the parameter database 735 are similar to respective ones of the geo-zone database 620, the behavior profile database 625 and the parameter database 635 of the operations center 600. The geo-zone database 720, the behavior profile database 725 and the parameter database 735 will store some of the mission profiles stored in the respective databases of the operations center 600. The number of mission profiles stored in the monitoring device 700 is limited by the amount of memory in the monitoring device 700.

Route Management Using Geo-Zones

As discussed above, the monitoring device stores one or more mission profiles including geo-zones, reporting behavior profiles and design parameters that each define behavioral functions that affect conditions under which the monitoring device initiates transmission of a message to the operations center 112, the government interface 124 and/or the commercial interface 134. At least a portion of the reporting behavior profiles and parameters are a function of location. The location dependent behavior profiles and parameters utilize geo-zones to mathematically define route boundary segments of a desired route which, when associated with a defined time schedule, allow for tracking of an asset. In contrast to remote monitoring devices that periodically report location information to a data center, the monitoring device reports information based on position and states of sensors. Such event based reporting can result in fewer reporting incidents, compared to periodic reporting, and lower power consumption at the monitoring device.

When an asset (e.g., a container, truck, or cargo) is being monitored by a monitoring device, the monitoring device can determine if the asset deviates from its intended route and schedule using the geo-zones defined by a reporting behavior profile. By monitoring the present location of the asset, e.g., using GPS, and comparing the present location with a mathematical route defined by the geo-zones, the monitoring device can communicate a timely notification to the owners of or third parties responsible for the asset when the asset is not where it is suppose to be when it is suppose to be there. Possible scenarios that can be identified include hijack, misdirected cargo, cargo inadvertently left for an extended period of time at a transfer point, etc. Using geo-zones, the owner/responsible party can define a route and schedule for the asset. This route/schedule is preloaded into the monitoring device, e.g., in the persistent storage 444.

Figure 8A:
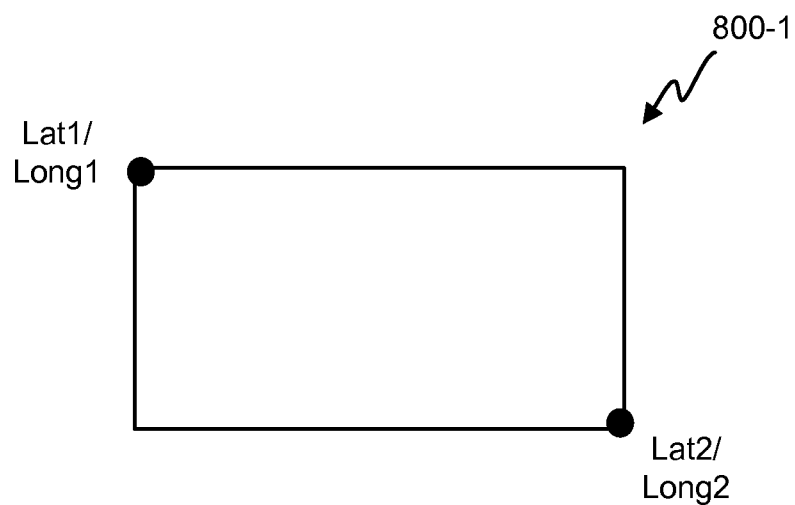
FIGS. 8A, 8B, 8C, 8D, 8E and 8F are illustrations of route boundary segments used in a route management system in accordance with the disclosure.

Referring to FIG. 8A, a first rectangular geo-zone route segment 800-1 is illustrated. The geo-zone segment 800-1 is a rectangular segment aligned with specific latitude and longitude lines, and is referred to as a lat/long rectangle. The lat/long rectangle 800-1 is defined by two pairs of latitude and longitude, a first pair lat1 and long1 in a Northwest corner and a second pair lat2 and long2 in the Southeast corner. When mapped to a spherical earth model, the lat/long rectangle segment 800-1 covers an area that resembles a trapezoid rather than a true rectangle.

Figure 8B:
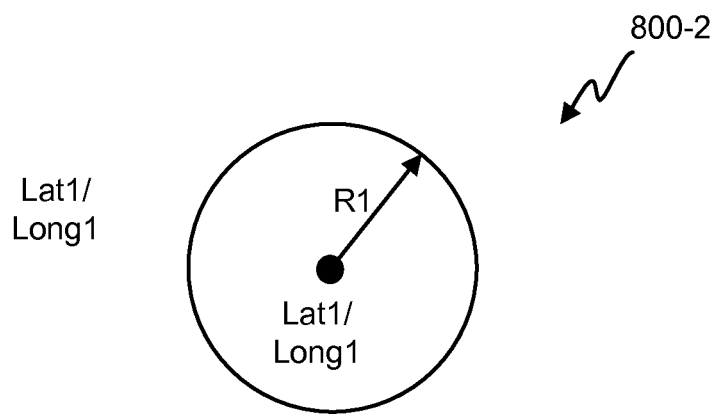

Referring to FIG. 8B, a second circular geo-zone route segment 800-2 is illustrated. The circular geo-zone segment 800-2 is defined by a center point with a latitude Lat1 and a longitude Long1 and a radius R1. When mapped to a spherical earth model, the circular segment 800-1 covers an area that resembles an egg rather than a true circle.

Figure 8C:
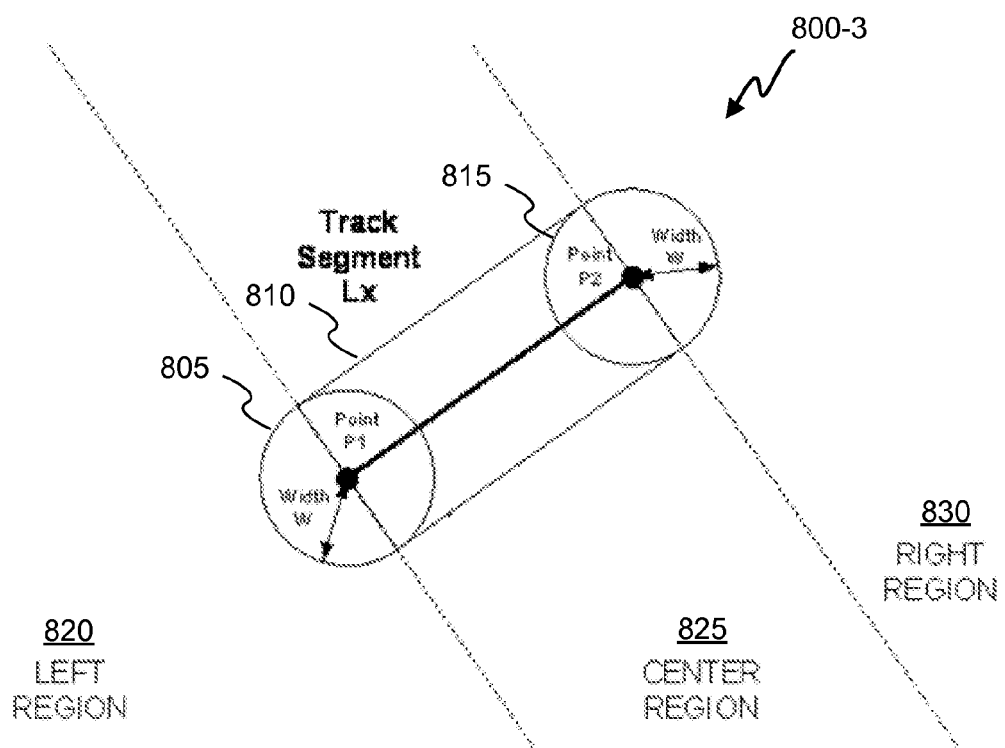

Referring to FIG. 8C, a racetrack geo-zone route segment 800-3 is illustrated. Each racetrack route segment 800 is composed of three pieces, a first circle (or half circle) 805 with a radius "w" centered at a first end point $P_1$, a second circle (or half circle) 815 with a radius "w" centered at a second end point $P_2$ and a rectangle 810 with a first dimension $L_1=|P_2-P_1|$ and a second dimension $L_2=2w$, where $L_2$ is perpendicular to L1.

In the embodiment shown in FIG. 6C, the radius of the first and second circles 805 and 815 defines the half-width of the rectangle 810 and thus the amount of deviation from the planned path along the line segment of length $L_1$ that the monitoring device can experience before the monitoring device is controlled to initiate a reporting message. Utilizing the circles 805 and 815 allows the geo-zone route segments 800-3 to be joined together with no gaps between the geo-zone route segments 800-3. In an alternative embodiment, the half width of the rectangle 810 can be specified separately from the radii of the circles 805 and 810. In this alternative embodiment, the radii of the circles 805 and 810 can be set to zero to arrive at a rectangular geo-zone segment that has no circular ends. This alternative embodiment is referred to as an angular rectangle, as opposed to the lat/long rectangle segment 800-1. An angular geo-zone segment is not necessarily aligned with latitude and longitude lines.

The different geo-zone segments 800 can be combined to form a route profile that a monitoring device is planned to follow during a delivery. The dimensions of the geo-zone segments 800 can depend on several things. The size can depend on the curvature of the road that is being traveled. The size of the geo-zone segment 800 can also depend on the mode of transportation. A train could utilize a small dimension such as, for example, 100 yards or less because the railroad tracks offer fewer alternatives than roads, air travel or sea travel. Sea travel routes could use larger dimensions, e.g., on the order of 100 miles or more. Similarly, air travel can utilize larger dimensions for the geo-zone segments 800.

When the monitoring device identifies a route deviation that is outside of the geo-zone route segment 800, a message is initiated, e.g., to the data center 112, which in turn notifies the end customer, e.g., at the government interface 124 or the commercial interface 134, of the deviation and present status. The present status can include states of any sensors monitored by the monitoring device.

Figure 8D:
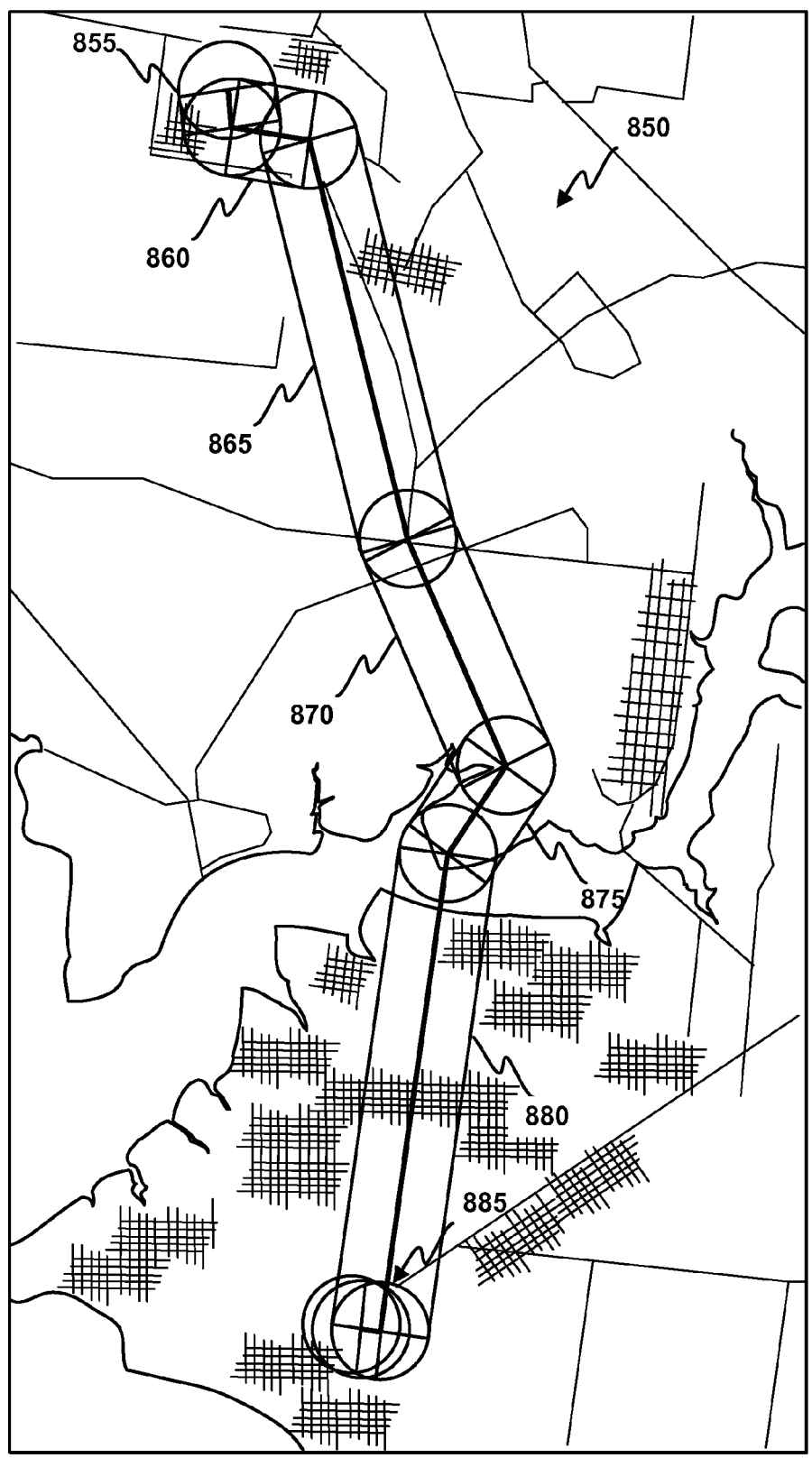

Referring to FIG. 8D, an example of a planned route 850 with route boundary segments 855, 860, 865, 870, 875, 880 and a group of three route boundary segments 885 is shown overlaid on a map. In this example, all the route boundary segments are racetrack geo-zone segments 800-3, but other geo-zone segment shapes can also be used (e.g., lat/long rectangle segments 800-1, circular segments 800-2 and angular rectangle segments). As can be seen, the second end point $P_2$ of the segment 855 is used as the first end point $P_2$ of the segment 860. The second circle 815 of the segment 855 and the first circle of the segment 860 are therefore concentric. This is true for all the connected route segments.

The route segments or geo-zones discussed herein include two circles and a rectangle. However, other geo-zones types can be used such as, for example: parallelograms, triangles, or other three-sided or four-sided geometric shapes.

The monitoring device wakes up to perform a location check. The wakeup can be periodic, in response to a sensor detecting a change of state or in response to an incoming signal, e.g., an input to the user interface or a signal received by one of the radios (the LAN or WAN radio, depending on the monitoring device). When the monitoring device wakes up, it performs the following steps:
  I. The monitoring device determines the current location (latitude and longitude) using GPS.
  II. The monitoring device then steps through each route segment of the reporting behavior profile using the algorithm described below trying to determine if the device is currently located within any of the route segments.
  III. If the unit is within one of the route segments, then the unit is on track (from a geography point of view).
  IV. If the geo-zone has changed from one route segment to another route segment:
    i. A new behavior and profile change may occur
    ii. The previous behavior can have a flag set to cause the monitoring device to initiate a report to the operations center 112, or other remote location, when leaving the previous geo-zone
    iii. The new behavior can have a flag set to cause the monitoring device to initiate a report to the operations center 112, or other remote location, when entering the new geo-zone
  V. If the monitoring device is not within any of the route segments, then the monitoring device is not on the pre-determined route, as defined by the reporting behavior profile, and the monitoring device initiates a report to the operations center 112, or other remote location.

The goal of the route segment (or line segment) geo-zone location algorithm is to find the distance between the current location of the monitoring device as determined by GPS, referred to as point $P_{gps}$, and a line segment Ln (the "nth" route segment in a route defined by the reporting behavior profile) between the first endpoint $P_1$ and the second endpoint $P_2$ of the nth route segment 800. The line Ln between $P_1$ and $P_2$ is the idealized route between the two points.

Figure 8E:
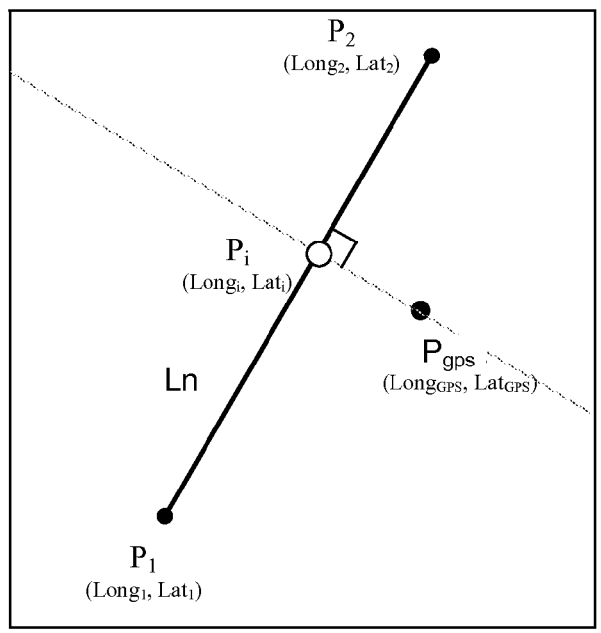

Referring to FIG. 8E, given the current location $P_{gps}$, the geo-zone location algorithm is used to find a point Pi that lies on the line $L_n$. Then the distance between point Pi and point $P_{gps}$ can be computed. This equates to the distance from the GPS position to the center line $L_n$. If the distance between Pgps and the center line Ln is greater than the radius w of the circles, then the monitoring device has deviated beyond the border of the defined route segment 800.

As illustrated in FIG. 8E, in order to determine whether or not the current location $P_{gps}$ is within the allowable route deviation distance of a route segment 800, a perpendicular line that intersects the point $P_{gps}$ and is perpendicular to the line segment $L_1$ between the first endpoint $P_1$ and the second endpoint $P_2$. is determined (see line $L_{int}$ in FIG. 8E). The following variable definitions are used to explain the geo-zone location algorithm
  $P_1$ and $P_2$: The first and second endpoints of the route segment where $P_1$ and $P_2$ are vectors with a latitude component, Lat and a longitude, Long.
  $Lat_1$ and $Lat_2$: Latitude of $P_1$ and $P_2$, respectively
  $Long_1$ and $Long_2$: Longitude of $P_1$ and $P_2$, respectively
  Width: The dimension "w" of the geo-zone segment 800 shown in FIG. 8C, which defines the radius of the circles 805 and 815 and the half-width of the rectangle 810.
  $P_{gps}$: The current position of the monitoring device, as determined by the latest GPS fix
  $Lat_{gps}$ and $Long_{gps}$: Latitude and longitude of Pgps
  $L_1$: The line segment between points $P_1$ and $P_2$ that defines the route segment 800 center line
  $L_{int}$: The line of intersection between points Pgps and the line segment $L_1$
  $P_i$: The point of intersection between $L_1$ and $L_{int}$.
  $Lat_i$ and $Long_i$: Latitude and longitude of $P_i$ The slope, m, of $L_1$, is calculated with the following formula:

$$m = \frac{Lat_2 - Lat_1}{Long_2 - Long_1}, \quad (1)$$

and the equation for line $L_1$ is:

$$L_1: Lat = m(Long - Long_1) + Lat_1, \quad (2)$$

where Lat and Long are the latitude and longitude variables of the line segment $L_1$. The slope of the line $L_{int}$ is perpendicular to the slope of $L_1$ and is therefore equal to:

$$-\frac{1}{m}, \quad (3)$$

and the equation for line $L_{int}$ is therefore given by:

$$L_{int}: Lat = -\frac{1}{m}(Long - Long_{gps}) + Lat_{gps}, \quad (4)$$

where Lat and Long are the latitude and longitude variables of the line segment $L_{int}$. Given equation (2) for $L_1$ and equation (4) for $L_{int}$, the coordinates of $P_i$ can be determined by setting equations (2) and (4) equal to each other while substituting $Lat_i$ and $Long_i$ for Lat and Long, respectively, and solving for $Long_i$ as follows:

$$-\frac{1}{m}(Long_i - Long_{gps}) + Lat_{gps} = m(Long_i - Long_1) + Lat_1 \quad (5)$$

Given equation (5), the following manipulations are performed to solve for $Long_i$:

$$-\frac{1}{m}(Long_i - Long_{gps}) = \qquad (6)$$
$$m(Long_i - Long_1) + Lat_1 - Lat_{gps} - (Long_i - Long_{gps}) =$$
$$m^2(Long_i - Long_1) + m(Lat_1 - Lat_{gps})Long_i - Long_{gps} =$$
$$m^2(Long_1 - Long_i) + m(Lat_{gps} - Lat_1)Long_i = m^2 Long_1 -$$
$$m^2 Long_i + m(Lat_{gps} - Lat_1) + Long_{gps}Long_i + m^2 Long_i =$$
$$m^2 Long_1 + m(Lat_{gps} - Lat_1) + Long_{gps}Long_i(1 + m^2) =$$
$$m^2 Long_1 + m(Lat_{gps} - Lat_1) + Long_{gps}Long_i =$$
$$\frac{m^2 Long_1 + m(Lat_{gps} - Lat_1) + Long_{gps}}{1 + m^2}$$

and finally the value of $Long_i$ is given by:

$$Long_i = \frac{m(mLong_1 + Lat_{gps} - Lat_1) + Long_{gps}}{m^2 + 1} \quad (7)$$

To find $Lat_i$, $Long_i$ is substituted into equation (2), or alternatively, equation (4), resulting in:

$$Lat_i = m(Long_i - Long_1) + Lat_1 \qquad (8)$$

At this point, the location (in lat/long) of point $P_i$ has been determined. The next step is determining whether or not the present location $P_{gps}$ is in the geo-zone route segment 800. In reference to FIG. 8C, there are three different distance equations used for three different regions of the route segment 800. The three regions include a left region 820, a center region 825 and a right region 830. The first step is to determine in which region the point $P_{gps}$ is located.

Figure 8F:
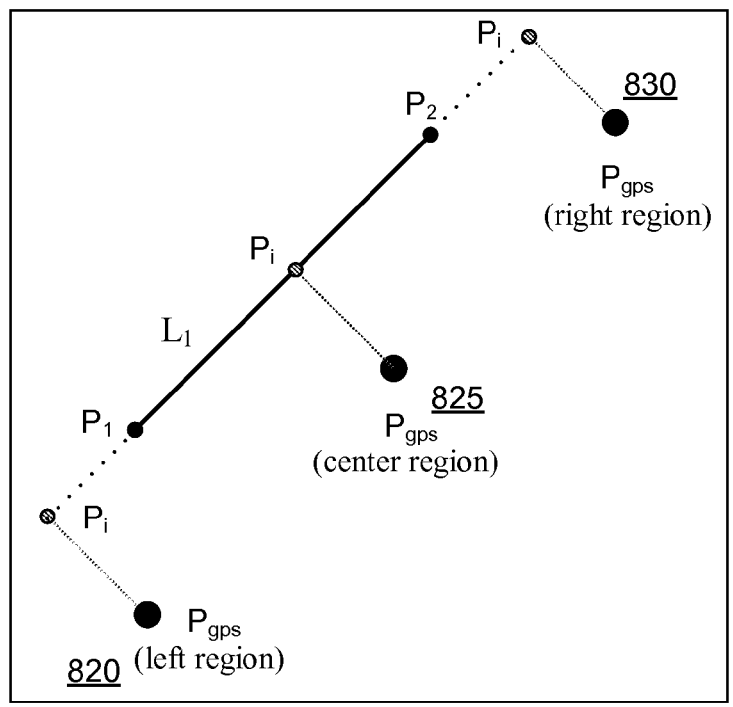

Which region $P_{gps}$ is located in is determined by comparing the coordinates of $P_i$ with those of $P_1$ and $P_2$. Referring to FIG. 8F, three positions of $P_{gps}$ are illustrated, with $P_{gps}$ and $P_i$ being located in the left region 820, in the center region 825 and in the right region 830. If $P_i$ is between $P_1$ and $P_2$, then $P_{gps}$ is in the center region. In order to determine that $P_i$ is in the center region, the monitoring device need only compare $Lat_1$, $Lat_2$, and $Lat_i$. If $Lat_2 > Lat_i > Lat_1$, then it must also be true that $Long_2 > Long_i > Long_1$ because $P_1$, $P_i$, and $P_2$ are all on the same straight line. Referring to FIG. 9, a listing of computer pseudo-code illustrates sample logic used to determine in which region $P_i$ and $P_{gps}$ are located.

When $P_{gps}$ is in the center region 825, the distance between $P_{gps}$ and the intersection point $P_i$ is calculated to determine that $P_{gps}$ is within the route segment 800. The coordinates (Lat/Long) of $P_{gps}$ and the intersection point $P_i$ are in degrees and are converted to kilometers by multiplying by a conversion factor K, where:

$$K = 111.12 \frac{km}{deg} \qquad (9)$$

Therefore, the distances in the Lat direction, $\Delta Lat$, and in the Long direction, $\Delta Long$, are given by:

$$\Delta Lat\ (km) = K(Lat_{GPS} - Lat_i) \qquad (10)$$

$$\Delta Long\ (km) = K[(Long_{GPS} - Long_i)\cos(Lat_1)] = (Long_{Gps} - Long_i) \cdot K \cos(Lat_1) \qquad (11)$$

The point $P_{GPS}$ is close enough to the Geo-zone center line if:

$$\sqrt{(\Delta Lat)^2 + (\Delta Long)^2} < width \qquad (12)$$

To avoid use of the square-root function, e.g., in a computationally limited device, equation (12) can also be reformulated as:

$$[K(Lat_{GPS} - Lat_i)]^2 + [(Long_{GPS} - Long_i) \cdot K \cos(Lat_1)]^2 < width^2 \qquad (13)$$

In some embodiments, the monitoring device can use a simplified distance calculation to determine the distance between two geographical points. The simplified distance calculation assumes near-earth geographies and does not take into account the great-circle effects of the latitude.

When $P_{gps}$ is in the right region 820 or the left region 830, it is located in one of the circles 805 and 815 at each end of the Geo-zone segment 800. Each circle 805 and 815 has a radius equal to the variable width. Therefore, if $P_{GPS}$ is determined to be in the left region 820 or right region 830, then $P_{gps}$ will be within one of the circles 805 or 815 if the distance between $P_{gps}$ and $P_1$ or $P_2$ is less than width. The distance between $P_{gps}$ and $P_1$ or $P_2$ is calculated using a modification to the Pythagorean theorem that compensates for lines of longitude getting closer together at higher latitudes:

$$[K(Lat_{GPS} - Lat_1)]^2 + [(Long_{GPS} - Long_1) \cdot K \cos(Lat_1)]^2 < width^2 \qquad (14)$$

The following data items are pre-computed for each route segment and stored in the persistent storage 444 of the monitoring device 400 to simplify the on-board computational requirements:

$$Slope\ m = \frac{Lat_2 - Lat_1}{Long_2 - Long_1} \qquad (15)$$

$$InvSlope = \frac{1}{m^2 + 1} \qquad (16)$$

$$WidthSquared = width^2 \qquad (17)$$

$$Cosine\ Lat1 = \cos(Lat_1) \qquad (18)$$

For a strictly vertical line equation 15 is slightly changed to avoid a divide by zero.

For each defined route segment 800, the following data items are stored in the persistent storage 444 of the monitoring circuit 400:
1. P1 Latitude
2. P1 Longitude
3. P2 Latitude
4. P2 Longitude
5. Cosine Lat1
6. Slope
7. InvSlope
8. WidthSquared If Points P1 and P2 are the same, then this is equivalent to a circular geo-zone segment 800-2. If the circular ends are not used, then this is equivalent to an lat/long rectangle geo-zone segment 800-1 or the angular geo-zone segment.

The geo-zone location algorithm discussed above determines the geographical deviation between the monitoring circuit 400 and a planned route. The monitoring circuit 400 can also determine a route deviation based on a time schedule.

For each of the geo-zone route segments 800 contained in a reporting behavior profile, a time-in-segment parameter can be defined such that, if the asset is in the defined route segment longer than the specified time-in-segment parameter, then the monitoring circuit 400 initiates a message to a remote location, e.g., the operations center 112, the government interface 124 and/or the commercial interface 134.

Because the route segment based time intervals can be too granular (too small), in some instances, the controller 408 is configured to group a number of route segments 800 together such that the total time in the group cannot be exceeded. For example, if the route from city A to city B is made up of 100 route segments, then these segments can all be placed in a common group such that the total time from City A to City B cannot be exceeded without triggering a reporting event.

Figure 10:
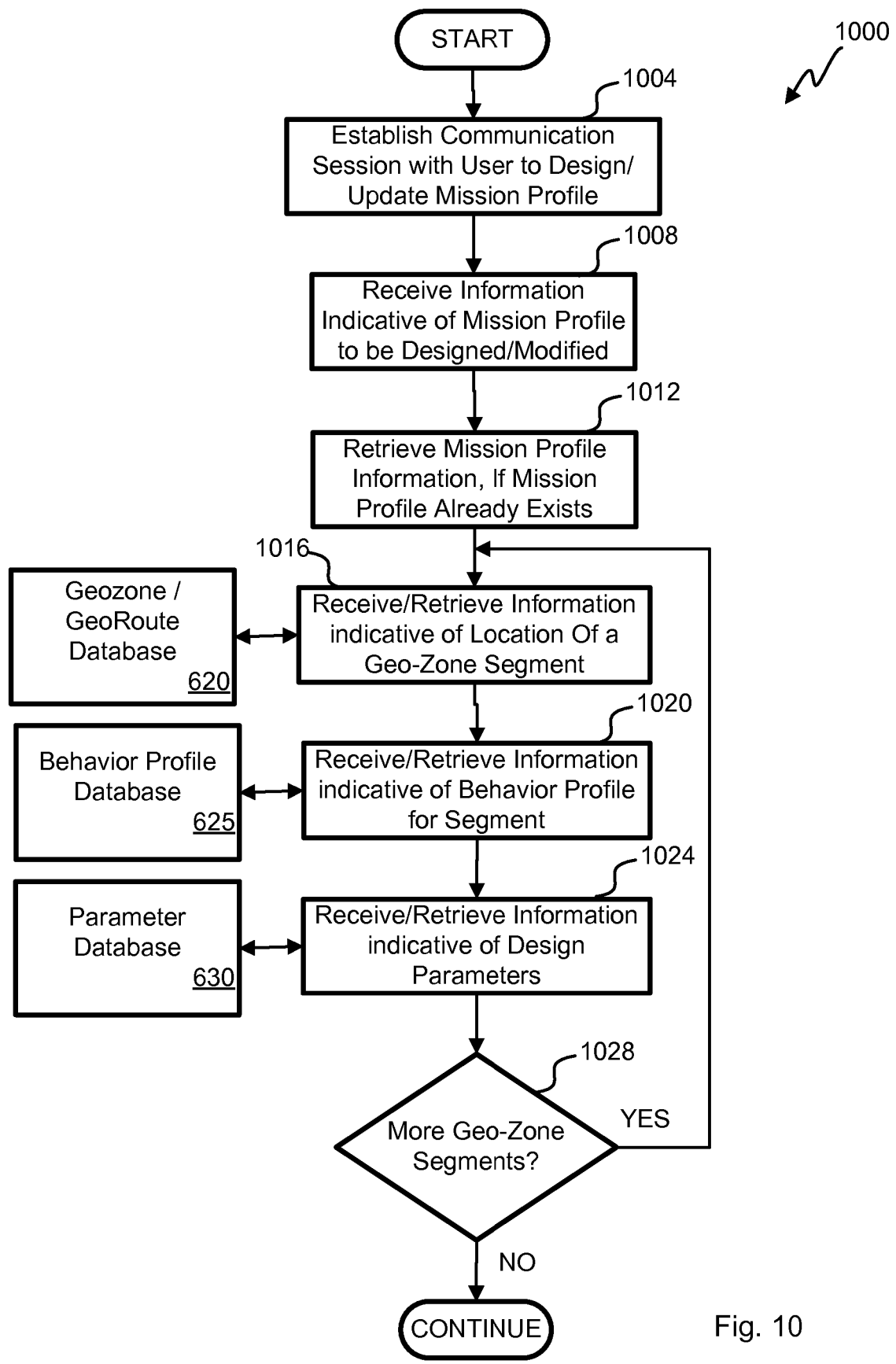
FIG. 10 is a flow diagram of a process for designing and/or updating mission profiles in accordance with the disclosure.

Referring next to FIG. 10, a flow diagram of a process 1000 for designing and/or updating mission profiles is shown. The process can be performed by the operations center 600 shown in FIG. 6. In reference to FIGS. 6 and 10, at block 1004, the communication interface 605 establishes a communication session with a user to design a new mission profile or to update an existing mission profile. The communication session can be over the internet in the form of a web browser session. The communication session can be a secure, encrypted, session. The user can be a user located at the government interface 124 or the commercial interface 134. The user could also be located at the location of a monitoring device and using a mobile device.

At block 1008, the communication interface 605 receives information form the user indicative of a mission profile that is to be designed or updated. The information received at interface 605 can include a number or name identifying an existing mission profile, a number or name of a new mission profile, a user identifier, a company identifier or other information that can be used to narrow down the search for related mission profiles stored in the databases 620, 625 and 630. The information received at stage 1008 is forwarded by the communication interface 605 to the operating profile manager 610 and/or the mission profile design system 615. The operating profile manager 610 and/or the mission profile design system 615 use the information received at block 1008 to identify which portions of the databases contain stored information relevant to the user, the company or other entity associated with the mission profile being designed or updated.

At block 1012, the mission profile design system 615 retrieves information associated with the identified mission profile, if a mission profile already exists. The information retrieved at block 1012 can be pointers to geo-zones contained in the geo-zone database 620 that are associated with the selected mission profile.

At block 1016, the mission profile design system receives, via the communication interface 605, information from the user indicative of a location of a geo-zone segment that is to be designed or modified. If the geo-zone segment already exists, the mission profile design system 615 retrieves the geo-zone segment information from the geo-zone database 620. If the geo-zone segment is new and does not exist, the mission profile design system 615 creates a new pointer in the geo-zone database 620 related to a memory location where the identified geo-zone segment will be stored.

The location information that the mission profile design system 615 receives at block 1016 can be input by the user in the form of numbers representing latitude, longitude and dimensions (e.g., circle radius, rectangle width), or can be input graphically by the user selecting a portion of a digital map representation. The information received at block 1016 can also include the type of geo-zone segment that is to be represented (e.g., a lat/long rectangle segment 800-1, a circular segment 800-2, a racetrack segment 800-3 or an angular rectangle). The mission profile design system 615 stores information indicative of the location and the geo-zone segment type in the geo-zone database 620. The mission profile design system 615 also stores pointers in a portion of memory storing the selected mission profile data, where the pointers identify the geo-zone segment that was just updated or created and the portion of memory in the geo-zone database where the segment is stored. The selected mission profile data can be stored in a portion of the geo-zone database 620.

At stage 1020, the mission profile design system 615 receives, via the communication interface 605, information from the user indicative of a behavior profile that is to be associated with the segment created/updated at block 1016. If the indicated behavior profile already exists, the mission profile design system 615 retrieves the profile from the behavior profile database. The behavior profiles can include, but are not limited to, any of the behaviors listed in Table 1. The indicated behavior profile can be a behavior profile that was used for a different mission profile. If the behavior profile is a newly created behavior profile, the mission profile design system 615 creates a new pointer in the selected mission profile data of the geo-zone database 620, the pointer identifying a location in the behavior profile database 625 where the behavior profile information will be stored.

Other information received at block 1020 can include updated behavior profile data if an existing behavior profile exists. If the behavior profile does not exist, new information indicative of the functions associated with the behavior profile are received. This other information is also stored in association with the selected behavior profile in the behavior profile database 625.

At stage 1024, the mission profile design system 615 receives, via the communication interface 605, information from the user indicative of a design parameter that is to be associated with the behavior profile and the geo-zone segment created/updated at blocks 1020 and 1016, respectively. If the indicated design parameter already exists, the mission profile design system 615 retrieves the design parameter from the parameter database 630. The design parameters can include, but are not limited to, any of the design parameters listed in Table 2. The indicated design parameter can be a design parameter that was used for a previous different mission profile. If the design parameter is a newly created design parameter, the mission profile design system 615 creates a new pointer in the selected mission profile data of the geo-zone database 620, the pointer identifying a location in the design parameter database 630 where the design parameter information will be stored.

At stage 1028, the mission profile design system 615 determines whether the user has more geo-zone segments to design and/or update in the selected mission profile. If not, the process 1000 terminates. If the user indicates that other geo-zone segments exist, the process 1000 continues to repeat the functions performed at blocks 1016, 1020, 1024 and 1028.

The process 1000 is exemplary only. Blocks can be omitted or rearranged and new blocks can be added.

Figure 11:
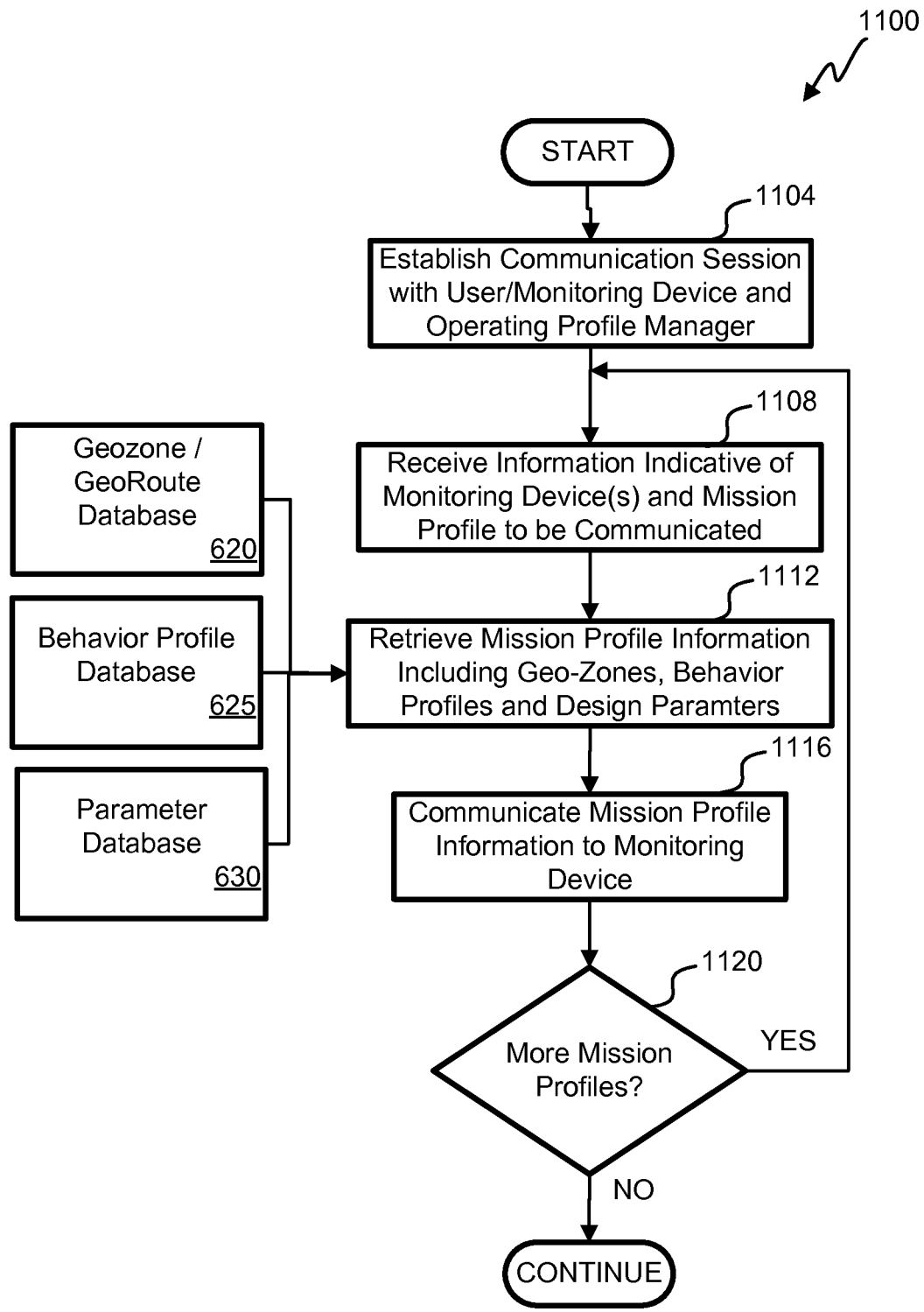
FIG. 11 is a flow diagram of a process for communicating mission profile information to a monitoring device in accordance with the disclosure.

Referring next to FIG. 11, a process 1100 for communicating mission profile information to a monitoring device is shown. The process 1100 can be performed by the operations center 600 shown in FIG. 6. In reference to FIGS. 6 and 11, at block 1104, the communication interface 605 establishes a communication session with a user or a monitoring device to download a new mission profile or to download modifications or updates to an existing mission profile. The communication session can be a secure, encrypted, session. The user can be a user located at the government interface 124 or the commercial interface 134. The user could also be located at the location of a monitoring device and using a mobile device. The communication session could be initiated by a monitoring device if the monitoring device was unable to identify a suitable mission profile in the memory of the monitoring device.

At block 1108, the communication interface 605 receives information indicative of a monitoring device and a mission profile to be communicated with the monitoring device. If the communication session was established by a user, the user can provide a monitoring device identifier and a mission profile identifier. If the communication session was established with a monitoring device, the monitoring device could provide location information, motion (still or moving) information, sensor state information, etc., and the operations center 600 can attempt to identify a mission profile that is associated with the location, and/or the motion information and/or the sensor states. The information received at block 1108 is forwarded to the operating profile manager 610.

At block 1112, the operating profile manager 610 uses the information received at block 1108 to identify the mission profile to be downloaded to the specified monitoring device and to retrieve the information. The operating profile manager 610 can use the mission profile identifier to identify a mission profile stored in the geo-zone database 620. The mission profile will contain pointers identifying portions of memory in the behavior profile database 625 and the parameter database 630 containing the associated behavior profiles and design parameters.

If a mission profile identifier was not provided, e.g., a monitoring device provided location information and/or motion information and/or sensor information, the operating profile manager 610 can search for mission profiles that include geo-zone segments at the location and that include behavior profiles associated with the motion information and/or sensors associated with the sensor information.

At block 1116, the communication interface 605 communicates the mission profile information to the monitoring device identified at block 1108. The mission profile information can be communicated over a WAN, satellite network, cellular phone network or a LAN. The operating profile manager 610 keeps a stored record of which mission profiles are stored at which monitoring devices. The operating profile manager 610 can include instructions with the mission profile information instructing the monitoring device where to store the mission profile. For example, if the monitoring device has extra memory space, the operating profile manager can provide instructions as to where to store the mission profile in the extra memory space. If no extra memory space is available, the operating profile manager can communicate instructions to overwrite another mission profile (e.g., an oldest or least used mission profile).

At stage 1120, the operating profile manager 610 determines if more mission profiles are to be communicated to the monitoring device. If the user or the monitoring device indicates that no more mission profiles are to be communicated, the process 1100 ends. If the user, or the monitoring device indicates that more mission profiles are to be communicated, the blocks 1108, 1112, 1116 and 1120 are repeated.

The process 1100 is exemplary only. Blocks can be omitted or rearranged and new blocks can be added.

Figure 12:
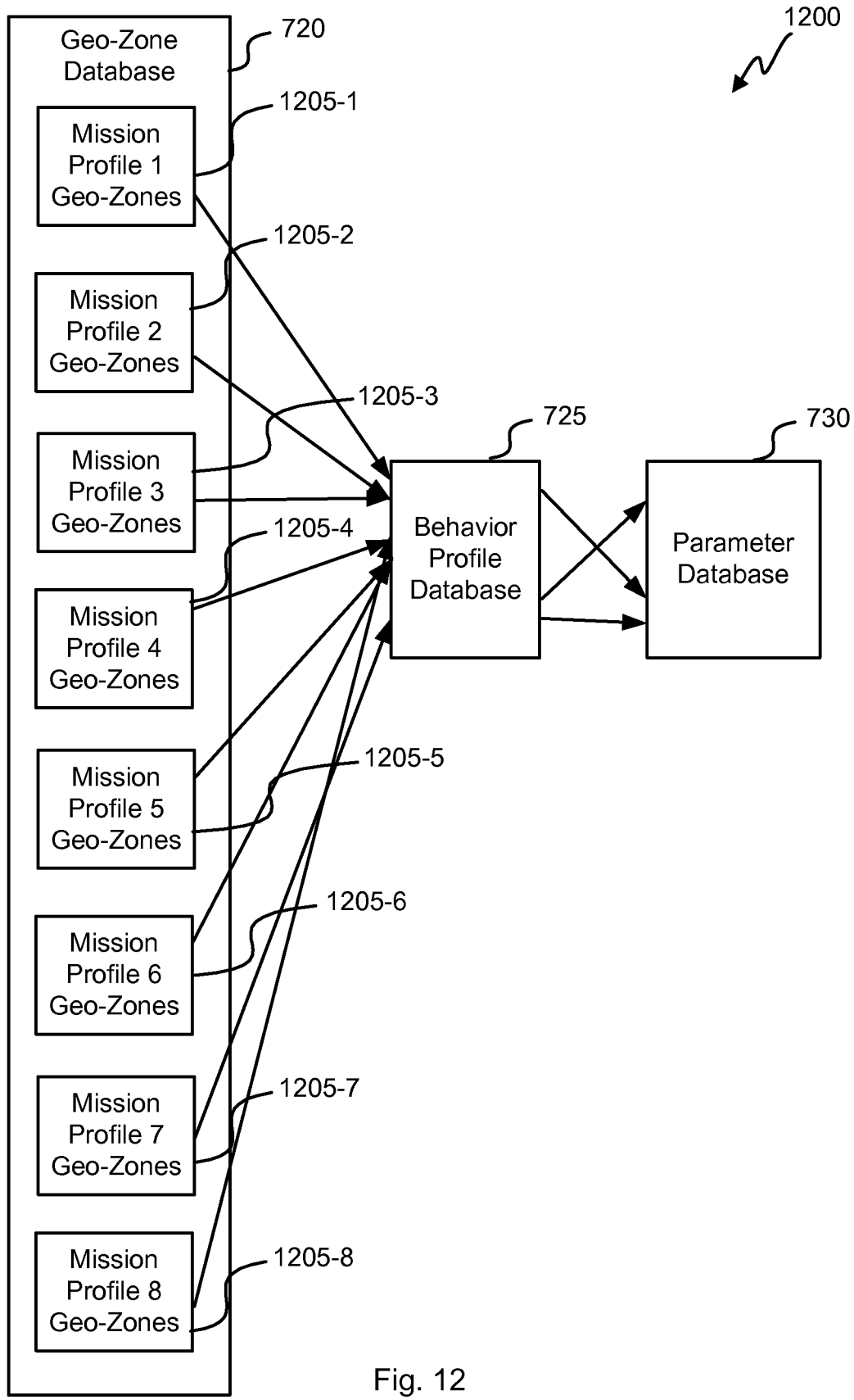
FIG. 12 depicts an example of a mapping of mission profiles to different databases.

As discussed above, in reference to block 1116 of the process 1100, the operating profile manager 610 can instruct a monitoring device where to store a mission profile. This can be accomplished through the use of a memory map that has specific memory locations (also referred to as memory banks) where mission profiles are store, and other specific memory locations where behavior profiles and design parameters are stored. Referring next to FIG. 12, a memory map 1200 depicts a mapping of mission profiles to different databases in a monitoring device.

With reference to FIGS. 7 and 12, the memory map 1200 depicts the geo-zone database 720 comprising eight mission profile geo-zone memory banks 1205-1, 1205-2, 1205-3, 1205-4, 1205-5, 1205-6, 1205-7 and 1205-8. The mission profile geo-zone memory banks 1205 include memory for storing the mission profile pointer data, and for storing the geo-zone segment data. The mission profile memory banks 125 include behavior profile pointers that point to portions of the behavior profile database 725 where specific behavior profiles for specific geo-zones are stored. Different mission profiles memory banks 1205 can point to the same behavior profiles in the behavior profile database 725.

The mission profile pointer data for each of the mission profile memory banks 1205 also includes parameter pointers to design parameters stored in the parameter database 730 to apply to the behavior profiles. The same design parameters can be pointed to by different mission profile memory banks 1205. The memory map 1200 shows eight mission profile memory banks, but a monitoring device can store more or fewer than eight mission profiles.

The operating profile manager 610 can store data indicative of which mission profiles, which behavior profiles and which design parameters are stored in the geo-zone database 720, the behavior profile database 725 and the parameter database 730, for each of the monitoring devices to which mission profiles are communicated. Using this monitoring device specific data, the operating profile manager 610 can determine where to store mission profiles, geo-zones, behavior profiles and design parameters for each monitoring device when the process 600 is performed.

Figure 13:
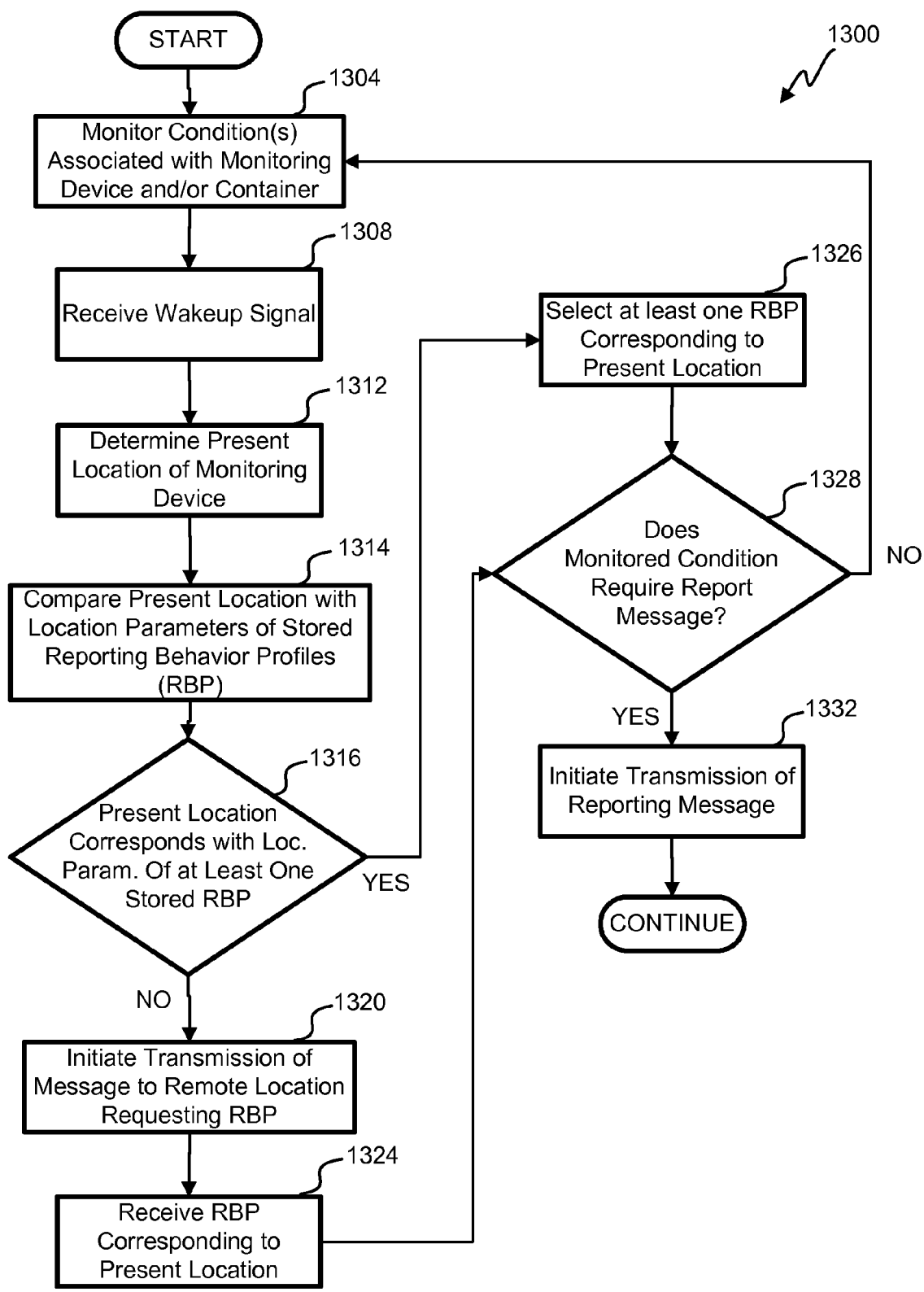
FIG. 13 is a flow diagram of an embodiment of a process for controlling behavior of a monitoring device in a route management system in accordance with the disclosure.

Referring next to FIG. 13, a flow diagram of an embodiment of a process 1300 for managing a reporting behavior of a container monitoring device is shown. In this example, the route management controller 715 is a part of the controller 408, and the route management functions will be described as being performed by the route management controller 715. In reference to FIGS. 4, 7 and 13, at block 1304, the controller 408 monitors various conditions associated with the monitoring circuit 400 and or the container. The monitoring can include receiving sensor data from sensors contained in the sensor module 428 that are integral with the monitoring circuit 400. The monitoring can also include receiving sensor data, via a sensor interface, from sensors associated with the container or its contents. The sensors associated with the container can include any types of sensors such as the sensors 128 shown in FIGS. 1A and 1B. The monitoring can be done periodically or when a sensor indicates that a state has changed.

The conditions monitored at block 1304 can include location related conditions such as, for example, the present location of the monitoring circuit 400, the present location of the monitoring circuit 400 deviating from a predetermined route (e.g., outside of one of the geo-zone segments 800), the present location remaining at a same location for a time exceeding a threshold, or the present location remaining within a region (e.g., within one geo-zone segment 800) for a time exceeding a threshold. The monitored conditions can also include characteristics associated with the container such as security related characteristics or environmental characteristics. Environmental characteristics can include, for example, CBRNE (chemical, biological, radiation, nuclear and explosives), temperature, pressure, humidity, weight, acceleration, sound, video, image, infrared, radiation (e.g., light or RF), etc.

At block 1308, the route management controller 715 receives a wakeup signal. The wakeup signal can be a periodic signal generated by the clock 412. The periodicity of the wakeup signal can be determined by a current reporting behavior profile that is being acted upon by the monitoring circuit 400. Alternatively, the wakeup signal can be received from a sensor, one of the sensors 128 associated with the container, or a sensor included in the sensor module 428. The wakeup signal can also be caused by a user interacting with the user interface 426. For example, a user could push a button of the user interface 426 or could cause a key fob or wireless device to interact with the user interface 426.

The wakeup signal received at block 1308 can be received during a delivery or the wakeup signal can be an initial wakeup signal that the controller receives at the beginning of a delivery route. If the wakeup signal is an initial wakeup signal, the present location is the starting point and the monitoring circuit 400 can be storing multiple reporting behavior profiles, each with a starting point. In this way, the c route management controller 715 can identify a reporting behavior profile to utilize based on the starting point location. The starting point location can be calculated using the position location module 432 or, alternatively, can be communicated to the controller by a key fob or other portable device such as the portable device 120 of FIG. 1.

An initial wakeup signal received from a key fob or other portable device can also include a destination. In these cases, the route management controller 715 can use the starting point location and the destination to determine which reporting behavior profile to select.

Upon receiving the wakeup signal at block 1308, the process 1300 continues at block 1312 where the controller 408 determines a present location of the monitoring circuit 400. The position location can be determined using data received from the position location module 432. The position location module can utilize technologies such as GPS, cell phone position location (e.g., CDMA, TDMA or GSM) or data received from a key fob or portable device.

Data indicative of the present location can be stored by the controller 408 in the persistent storage 444 along with data indicative of a number of times (or frequency) that a similar location has been experienced on previous deliveries. The stored frequency data can be used to identify a most likely delivery route and hence the most likely reporting behavior profile to use for a delivery. Alternatively, the location data and associated frequency data can be used to size the dimensions of the geo-zone segments 800. Statistical data such as mean location and standard deviation can be used in sizing the geo-zone segments 800.

At block 1314, the route management controller 715 compares the present location with location parameters associated with any of the reporting behavior profiles stored in the persistent memory 444 of the monitoring circuit 400. The route management controller 715 can compare the present location with locations of geo-zone location segments 800 for any of the stored reporting behavior profiles. If the location is indicated by the wakeup signal to be an initial location of a route, the route management controller 715 can search for starting points for the stored reporting behavior profiles. At decision block 1316, the route management controller 715 determines if the present location corresponds with any location parameters of the stored reporting behavior profiles. If a correspondence is affirmed at decision block 1316, the process continues to block 1326, where the controller 408 selects one or more reporting behavior profiles to be active.

In some embodiments, two reporting behavior profiles are defined for each geo-zone segment 800. A first reporting behavior profile is used when the monitoring circuit 400 is operating on internal batteries, and a second reporting behavior profile is used when the monitoring circuit 400 is running on an external power source (e.g., a truck power source). The second reporting cycle can have more frequent reporting times while the external power source is available and internal battery drain is not a concern.

The reporting behavior profiles can be dependent on the mode of transportation that is being utilized on the delivery route. If the present location is indicative of a location known to be associated with a certain mode of transportation, than the comparison at block 1314 and the subsequent determination at block 1316 can take this information into consideration. For example, if the present location is an airport, the route management controller 715 can search for reporting behavior profiles that are designed for air travel. If the present location is on a railroad or at a train depot, the route management controller 715 can search for reporting behavior profiles designed for rail travel. If the present location is at sea or at a shipping port, the route management controller 715 can search for reporting behavior profiles designed for sea travel. As discussed above in reference to FIG. 8, the dimensions of the geo-zone segments 800 can be sized differently for different modes of transportation.

If the determination at block 1316 is negative, the process 1300 continues at block 1320 where the controller 408 causes the wireless module 440 to initiate a transmission to a remote location, e.g., the operations center 112, the government interface 124 or the commercial interface 134, to request a reporting behavior profile that corresponds to the present location. The request for a reporting behavior profile can also include destination information, mode of transportation, owner identification, etc.

At block 1324, the route management controller 715 receives, via the communication interface 705 or the user interface 426, one or more reporting behavior profiles that correspond to the present location and/or other information transmitted to the remote location at the block 1320. In some situations, the remote location may delay transmitting the reporting behavior profile based on the present location of the monitoring circuit 400. For example, if the monitoring circuit 400 is located in an area known for poor wireless coverage, the transmission can be delayed until the location of the monitoring circuit 400 is in an area with stronger coverage. In some embodiments, the monitoring circuit 400 can use a default behavior profile instead of initiating a transmission at block 1320. The monitoring circuit 400 can store two default behavior profiles, a first default profile for use when the monitoring circuit 400 is operating on battery power and a second default profile for use when the monitoring circuit 400 is being powered by an external power source. If the monitoring circuit 400 is not able to get a valid GPS fix at block 1310, e.g., if the unit is in the hold of a ship, the monitoring circuit 400 can try to get a GPS fix a predetermined number of times and, if unsuccessful, the monitoring circuit 400 can use one of the two default behavior profiles.

Upon the route management controller 715 selecting a reporting behavior profile at block 1326, or receiving a reporting behavior profile at block 1324, the process 1300 continues at decision block 1328. At decision block 1328, the controller 408 determines whether or not to initiate transmission of a reporting message to a remote location based on the behavior parameters of the reporting behavior profile that the route management controller 715 is being utilized, and further based on the monitored conditions of the container and/or the monitoring device. Events that can trigger an affirmative determination at decision block 1328 include, but are not limited to, a present location that deviates outside of a geo-zone segment 800, being located within a geo-zone segment for a time greater that the time specified by a time-in-segment parameter of the reporting behavior profile, and/or a sensor measurement or state that is specified by one of the behavior parameters. Some geo-zone segments 800 can be defined as "waypoints" and the monitoring circuit 400 can be configured to initiate transmission of a reporting message when entering and/or exiting a waypoint.

If the determination at the decision block 1328 is negative, the process 1300 continues back to block 1304 to continue with the process 1300 as discussed above. If the determination is affirmative, the process 1300 continues at block 1332 with the controller causing the wireless module 1332 to initiate a reporting message to the remote location. The controller can determine which type of transmitter to use, e.g., either one of the transmitters of the dual mode WAN radio 520, or the transmitter of the LAN radio 522.

The determination of which transmitter to use can be based on the present location using a lookup table of preferred transmission types versus location. The transmitter determination can also be based on signal strength of a signal received for the dual-mode WAN radio 520 or the LAN radio 522. Upon transmitting the reporting message at block 532, the process 1300 continues as discussed above.

The embodiments of the monitoring devices discussed above are described in reference to shipping containers. However, those skilled in the art will recognize other implementations where other types of devices can be monitored with similar monitoring devices. For example, items that are shipped without containers such as, automobiles, aircraft, military vehicles, or any large item that is not enclosed in a container.

While the principles of the disclosure have been described above in connection with specific apparatuses and methods, it is to be clearly understood that this description is made only by way of example and not as limitation on the scope of the disclosure.

What is claimed is:

1. A system for operating a container management system, the system comprising:
    a housing configured to couple to a container, the container comprising a container identifier;
    a monitoring circuit at least partially enclosed within the housing, the monitoring circuit comprising a authentication code, the monitoring circuit comprising:
        a memory storing a plurality of reporting behavior profiles, each of the reporting behavior profiles defining behavior parameters affecting conditions under which the monitoring circuit initiates transmission of a message, at least a portion of the behavior parameters being a function of location,
        a sensor interface configured to receive information from one or more sensors associated with the container, the information being indicative of at least one condition associated with the container, wherein each of the one or more sensors comprises a unique sensor identifier;
        a position location module distinct from the sensor interface, the position module being configured to determine a location of the monitoring device,
        a door sensor distinct from the sensor interface, the door sensor being configured to detect when a door of the container is open or closed;
        a wireless module, and
        a controller coupled to the memory, the sensor interface, the wireless module and the position location module and configured to:
            monitor the at least one condition associated with container and/or another condition associated with the monitoring device,
            receive a wakeup signal,
            receive an indication of a present location of the monitoring device from the position location module in response to receiving the wakeup signal,
            determine a frequency comprising a number of times the present location has been experienced on previous deliveries,
            compare the present location with respective location parameters associated with respective ones of the plurality of reporting behavior profiles,
            identify a most likely reporting behavior profile from the plurality of reporting behavior profiles based at least in part on the comparison and the frequency,
            determine a size and a shape of geo-zone segments associated with the most likely reporting behavior profile based at least in part on the present location and the frequency, wherein the size the geo-zone segments is based at least in part on a mode of transportation of the container,
        and
            cause the wireless module to initiate a transmission of a reporting message to a remote location based on the behavior parameters of the most likely reporting behavior profile and the monitored condition of the monitoring device and/or the container, the reporting message comprising the authentication code, the container identifier, and the unique sensor identifier of the one or more sensors associated with the monitored condition; and
    a battery coupled to the monitoring circuit and configured to provide electrical power to at least a portion of the monitoring circuit.

2. The system for operating a container management system as in claim 1, wherein the at least one condition comprises the determined present location deviating from a predetermined route.

3. The system for operating a container management system as in claim 2, wherein the controller is further configured to determine a deviation between the present location and the predetermined route by determining a distance between the present location and a line connecting two points that defines a portion of the predetermined route.

4. The system for operating a container management system as in claim 2, wherein the predetermined route is represented by a plurality of rectangles and semi-circles or circles on a display of the monitoring device.

5. The system for operating a container management system as in claim 1, wherein the at least one condition comprises the determined present location remaining at a same location for a time exceeding a threshold time.

6. The system for operating a container management system as in claim 1, wherein the controller is configured to receive the wakeup signal from a key fob or a wireless device.

7. The system for operating a container management system as in claim 1, wherein the wakeup signal is an initial wakeup signal received at a beginning of a delivery route and the reporting behavior profiles correspond to starting point specific reporting behavior profiles.

8. The system for operating a container management system as in claim 1, wherein the wakeup signal is a periodically generated signal generated by a clock of the monitoring circuit, and wherein a periodicity of the periodically generated signal is determined by the at least one matching reporting behavior profile.

9. A method of managing the reporting behavior of a container monitoring device, the method comprising:
    receiving information at a monitoring device coupled to a container from at least one sensor associated with the container, the information being indicative of at least one condition associated with the container, the monitoring device comprising an authentication code and the container comprising a container identifier;
    monitoring the at least one condition associated with the container and/or another condition associated with the monitoring device using one or more sensors of the monitoring device, wherein each of the one or more sensors comprises a unique sensor identifier;

monitoring whether a door of the container is open or closed using a door sensor distinct from the sensor interface;
receiving a wakeup signal;
subsequent to receiving the wakeup signal, determining a present location of the monitoring device using a position module distinct from the at least one sensor;
determining a frequency comprising a number of times the present location has been experienced on previous deliveries;
comparing the present location with respective location parameters associated with respective ones of a plurality of reporting behavior profiles stored in a memory of the monitoring device, each of the reporting behavior profiles defining behavior parameters affecting conditions under which the monitoring device initiates transmission of a message, at least a portion of the behavior parameters being a function of location;
identifying a most likely reporting behavior profile from the plurality of reporting behavior profiles based at least in part on the comparison and the frequency;
determining a size and a shape of geo-zone segments associated with the most likely reporting behavior profile based at least in part on the present location and the frequency, wherein the size the geo-zone segments is based at least in part on a mode of transportation of the container;
and
determining to initiate a transmission of a reporting message to a remote location based on the behavior parameters of the most likely reporting behavior profile and the monitored condition of the monitoring device and/or the container, the reporting message comprising the authentication code, the container identifier, and the unique sensor identifier of the one or more sensors associated with the monitored condition.

10. The method of managing the reporting behavior of the container monitoring device as in claim 9, wherein the determined present location corresponds to a location specific to a mode of transportation, the method further comprising selecting one of the reporting behavior profiles corresponding to the specific mode of transportation.

11. The method of managing the reporting behavior of the container monitoring device as in claim 9, further comprising determining one of a plurality of communication systems to utilize for the transmission of the reporting message to the remote location based on the present location of the monitoring device.

12. The method of managing the reporting behavior of the container monitoring device as in claim 9, further comprising:
receiving an indication of a destination; and
determining the reporting behavior profile based at least in part on the indication of the destination.

13. A non-transitory machine-readable media having instructions stored thereon for managing the reporting behavior of a container monitoring device, the instructions causing one or more machines to:
receive information at a monitoring device coupled to a container from at least one sensor associated with the container, the information being indicative of at least one condition associated with the container, the monitoring device comprising an authentication code and the container comprising a container identifier;
monitor the at least one condition associated with the container and/or another condition associated with the monitoring device using one or more sensors of the monitoring device, wherein each of the one or more sensors comprises a unique sensor identifier;
monitor whether a door of the container is open or closed using a door sensor distinct from the sensor interface;
receive a wakeup signal;
subsequent to receiving the wakeup signal, determine a present location of the monitoring device using a position module distinct from the at least one sensor;
determine a frequency comprising a number of times the present location has been experienced on previous deliveries;
compare the present location with respective location parameters associated with respective ones of a plurality of reporting behavior profiles stored in a memory of the monitoring device, each of the reporting behavior profiles defining behavior parameters affecting conditions under which the monitoring device initiates transmission of a message, at least a portion of the behavior parameters being a function of location;
identify a most likely reporting behavior profile from the plurality of reporting behavior profiles based at least in part on the comparison and the frequency;
determine a size and a shape of geo-zone segments associated with the most likely reporting behavior profile based at least in part on the present location and the frequency, wherein the size the geo-zone segments is based at least in part on a mode of transportation of the container;
and
cause initiation of a transmission of a reporting message to a remote location based on the behavior parameters of the most likely reporting behavior profile and the monitored condition of the monitoring device and/or the container, the reporting message comprising the authentication code, the container identifier, and the unique sensor identifier of the one or more sensors associated with the monitored condition.

14. The non-transitory machine-readable media having instructions stored thereon for managing the reporting behavior of a container monitoring device as in claim 13, wherein the determined present location corresponds to a location specific to a mode of transportation, the instructions causing the one or more machines to select one of the reporting behavior profiles corresponding to the specific mode of transportation.

15. The non-transitory machine-readable media having instructions stored thereon for managing the reporting behavior of a container monitoring device as in claim 13, the instructions causing the one or more machines to determine one of a plurality of communication systems to utilize for the transmission of the reporting message to the remote location based on the present location of the monitoring device.

16. The non-transitory machine-readable media having instructions stored thereon for managing the reporting behavior of a container monitoring device as in claim 13, the instructions causing the one or more machines to:
receive an indication of a destination; and
determine the reporting behavior profile based at least in part on the indication of the destination.

* * * * *

UNITED STATES PATENT AND TRADEMARK OFFICE
CERTIFICATE OF CORRECTION

PATENT NO.        : 9,558,468 B2  
APPLICATION NO.   : 13/049704  
DATED             : January 31, 2017  
INVENTOR(S)       : Brian Donlan et al.

Page 1 of 1

It is certified that error appears in the above-identified patent and that said Letters Patent is hereby corrected as shown below:

On the Title Page

Under Assignee:  
Please change "Corporaton" to "Corporation"

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*